United States Patent
O'Regan et al.

(10) Patent No.: US 8,447,268 B2
(45) Date of Patent: May 21, 2013

(54) SYSTEM FOR BILLING RATING AND SELECTION OF ACCOUNTS

(75) Inventors: Michael O'Regan, Carrigaline (IE); Ian Deakin, Coachford (IE); Robert Mullins, Clonmel (IE)

(73) Assignee: Acision IPR Nederland B.V., Nieuwegein (NL)

( * ) Notice: Subject to any disclaimer, the term of this patent is extended or adjusted under 35 U.S.C. 154(b) by 1623 days.

(21) Appl. No.: 10/534,206

(22) PCT Filed: Nov. 6, 2003
(Under 37 CFR 1.47)

(86) PCT No.: PCT/IB03/00150
§ 371 (c)(1),
(2), (4) Date: Jan. 26, 2007

(87) PCT Pub. No.: WO2004/043053
PCT Pub. Date: May 21, 2004

(65) Prior Publication Data
US 2008/0027839 A1    Jan. 31, 2008

(30) Foreign Application Priority Data
Nov. 7, 2002 (EP) .................................... 02079659

(51) Int. Cl.
*H04M 11/00* (2006.01)

(52) U.S. Cl.
USPC .......................................................... 455/405

(58) Field of Classification Search
None
See application file for complete search history.

(56) References Cited

U.S. PATENT DOCUMENTS 6,952,575 B1 * 10/2005 Countryman et al. ........ 455/408
7,428,510 B2 *  9/2008 Titus et al. ...................... 705/39

FOREIGN PATENT DOCUMENTS

| WO | WO 98/56202 A2 | 12/1998 |
| WO | WO 99/60801 A1 | 11/1999 |
| WO | WO 01/63883 A2 | 8/2001 |
| WO | WO 01/58110 A2 | 9/2001 |

* cited by examiner

*Primary Examiner* — Paul Danneman
(74) *Attorney, Agent, or Firm* — McDermott Will & Emery LLP

(57) ABSTRACT

A method and system adapted for use in a mobile telecommunication network is described. The invention describes a rating and routing system which is adapted to enable an efficient rating and routing of data transactions being transmitted through a network. Based on a comparison of identifiers associatable with a subscriber to the network, with a set of parameters defined for data transactions, the system of the present invention is adapted to enable an accurate assessment and allocation of the correct rating tariff value to a specific transaction and the routing of that rated value to an appropriate destination defined for the user.

14 Claims, 19 Drawing Sheets

100

| X | Y | Z | PRICE | PRIMARY ACCOUNT | 2ND ACCOUNTS |
|---|---|---|---|---|---|
| A | D,F | * | 1 | 5 | 3,4,7 |
| A,B | E | H,I | 5 | 2 | 1,5,3 |
| * | * | G | 2 | 3 | 1,2 |
| * | * | * | 1 | 1 | 3,2,5 |

* DENOTES "Not Relevant"

ID Application No. PCT/IE2003/000150, filed 6 Nov. 2003 (incorporated by reference herein), and EP Application No. 02079659.5, filed 7 Nov. 2002(incorporated by reference herein).

SYSTEM FOR BILLING RATING AND SELECTION OF ACCOUNTS

This application claims priority from PCT Application No. PCT/IE2003/000150, filed 6 Nov. 2003 (incorporated by reference herein), and EP Application No. 02079659.5, filed 7 Nov. 2002(incorporated by reference herein).

FIELD OF THE INVENTION

The present invention relates to billing systems for data transmitted through mobile communication networks, and in particular to a billing routing system which rates a data message and optionally determines an appropriate billing system to process the charge or tariff for the transmission of the data message.

BACKGROUND TO THE INVENTION

The advancement of wireless or mobile telecommunications technology in recent years has been dramatic. The array of services offered today by mobile telecommunication network operators continues to expand. While voice related services were the primary services offered by network operators during the early stages of mobile phone use, there has been an ever-increasing number of data (non-voice) services available to subscribers. Common examples of data services include Short Message Service (SMS), Wireless Application Protocol (WAP) service and Multimedia Messaging Service (MMS).

In respect of data messages the number of services available is increasing. One more recent example of the services network operators have introduced is known as large account services. With large account services, a subscriber pays to receive an SMS message containing news on a chosen topic, for example updates on stock quotes, sports results etc. Another example is concatenated messaging, where a group of SMS messages are sent to deliver content to a mobile phone, for example a ringtone. As network architectures had developed from a predominantly voice traffic arena, most of the earlier network architectures for carrying data services were specifically designed for voice communication. However with the arrival of mobile data services, these architectures were forced to attempt to adapt to cater for the processing of data service communications as well. With the introduction of more and more data message services further adaptation is proving difficult.

When implementing a billing system for a mobile telecommunications network, network operators generally offer both pre and post paid subscriber accounts. Typically in post-paid voice systems, each time a subscriber makes a telephone call, the call details are logged. Periodically, for example on a monthly basis, the network operator bills the customer for the total call costs incurred during the course of the billing period. The cost of each call is determined by a rating applied to the call which is typically influenced by a number of factors. These factors may include not only the call duration, but the time of day, day of the week, call destination and the subscriber class of service (e.g. business or personal).

In the case of prepaid voice systems however, a user maintains a surplus account with the network operator and, when a user attempts to make a call, the balance of the user's prepaid account is checked, and the call is only permitted if the user's account is in credit above a minimum level defined by the network operator. If the user has insufficient credit to pay for the call, a recorded message is typically sent to the user informing them that further calls may be blocked until the user "tops up" their credit. As in the case of post-paid, pre paid voice systems conventionally provide for the rating of voice calls so as to provide a differential billing rate depending on the nature of the voice call.

FIG. 1 shows a typical network architecture 100 used for enabling data communication between two users in a mobile network, i.e. an originator or sender 10 and a receiver 25. Although data communications can vary in type (e.g. SMS, MMS and WAP services), the routing of a data communication will, for simplicity of explanation, be described with reference to a SMS type text message. The sender 10 who is a subscriber to a mobile network composes the text message using the keypad on their mobile phone. Once the message has been composed the user enters or selects a destination telephone number and the message is sent from their phone. On transmission of the message from the mobile telephone the message is routed via the mobile network and passes through the mobile switching centre (MSC) 15 to the home Short Message Switching Centre (SMSC) 20 of the originator 10. The SMSC 20 determines the destination of the message and then routes the message to the recipient 25. A billing module 30 interfaces with the switching centre of the mobile network 15 and the billing of such a message is effected at the network level prior to the forwarding of the message to the SMSC. The subscriber may be billed either a fixed price for the data message, or a price which is influenced by certain factors associated with the transmitted data message. Such a billing system is suitable for implementation when the network operator utilises a post-paid billing method, i.e. when the transaction charges for a plurality of data transmissions are accumulated together and the accumulated cost is billed to the post-paid subscriber on a monthly basis.

However, the above billing system implementation is not so suitable for prepaid subscriber data services. Historically, this method of billing data messages is unable to provide for prepaid subscriber roaming or charge for mobile terminated information data services, as no standards existed to allow the MSC 15 to charge for these types of services. However, recently a new standard for mobile networks, CAMEL (Customized Applications for Mobile Network Enhanced Logic) has been introduced which is attempting to address these problems. The CAMEL 3 standard addresses roaming and the CAMEL 4 addresses Mobile terminated charging. However, CAMEL 4 is not yet available, and while CAMEL 3 is available today, its adoption is not widespread, and the roaming solution relies on both the roaming and home network to be using CAMEL 3 and allowing the roaming network to send charges to the home network. Also, the volume of SMS traffic places a very high load on both the MSC and voice prepaid billing systems of the network.

A further disadvantage is that the technology used to provide data transfer as distinct from voice traffic in a mobile network lacks the functionality to enable the billing of data services in real time. This has the major disadvantage in the implementation of prepaid billing systems using hot billing, where prepaid customers with no available credit are at times able to continue to use data services. For example, prepaid users can still send SMS messages even after their account balance has fallen below the minimum threshold for voice calls. There is also the further problem with regards to the lack of standardisation in SMS charging methods between different MSCs. Furthermore as the billing systems interfacing to MSCs are specifically designed for use in a voice network they do not have the capability to provide advanced billing options for data communications. This has resulted in a significant loss of potential revenue for network operators, who are unable to reap the benefits that would be associated with being able to calculate the cost of each data service so as to depend on several variables associated with the message.

In addition, existing billing systems have also been unable to perform refunds, or charge for concatenated messaging, as the billing system is interfacing with the MSC, which has no knowledge of this information (it is the SMSC which has access to this information). Existing billing systems are also only able to charge based on message length, which is unsuitable for more advanced message such as WAP or MMS type messages, which would more suitably be charged based on content.

International patent application PCT/US01/05677 entitled "Prepaid Short Messaging" describes a method and apparatus for handling a prepaid message service in which the tariffing occurs prior to final transmission of the short messages. FIG. 2 shows a block diagram of such a system. This differs from the architecture shown in FIG. 1 in that a billing module or prepaid messaging server 40 is interfaced to the SMSC. The same reference numerals are used for the same components of the architecture. By providing the prepaid messaging server at the SMSC it is possible to bill specifically on the traffic as it passes through the SMSC and also in a data messaging specific manner. On receipt of a data message from the switching system 15, the SMSC 20 sends a query to the prepaid messaging server 40. This query is sent to an account database within the prepaid messaging server to determine if an account corresponding to the sender of the short message has sufficient funds to pay for the transmission of the short message. If this account has sufficient funds, the short message is transmitted. If, on the other hand, the account had insufficient funds the message is not transmitted. This system is advantageous in that it offers data specific rating and also enables the network operator to charge for data transactions during transfer between parties, and thus eliminates situations where a prepaid subscriber can send messages when they have insufficient funds available.

However, this system necessitates the subscriber maintaining two separate prepaid accounts; one account to charge for data charged services that resides within the prepaid messaging server, and another separate account elsewhere on the network dedicated to bill voice calls, with no provision for the transferring of funds between these two accounts. Therefore, such an architecture requires subscribers to ensure that they have sufficient credit in both their accounts in order to be able to avail of all the services offered by the network operator, and thus forces the subscribers to decide in advance how much credit they are going to require for each individual service i.e. voice and data. This system also does not provide the network operator with the option of deducting the cost of the data service directly from the subscriber's prepaid voice account if desired. Furthermore, the system is only suitable for use with prepaid subscribers.

There is therefore a need for a billing system and method of routing charges associated with data communications through a mobile telecommunication network that overcomes problems associated with the prior art.

SUMMARY OF THE INVENTION

These and other needs are provided by a method of the present invention, the method adapted for routing the tariff associated with one or more data transactions in a mobile telecommunication network to an appropriate billing system, wherein the mobile telecommunication network incorporates a data switching centre, the data switching centre being adapted to receive data transactions transmitted by a subscriber to the telecommunication network and route them to an appropriate destination, the method comprising the steps of:

a) receiving service detail records from a data switching centre associated with the mobile telecommunication network, the service detail records being associated with a specific data transaction having been previously transmitted by, or to, a subscriber within the telecommunication network, the service detail record containing a unique indicia associated with the subscriber, b) associating the retrieved unique indicia with one or more records previously stored in a subscriber database so as to establish a routing criteria for the specific subscriber, c) effecting the calculation of a tariff for the data transaction, and d) routing the tariff to one or more billing destinations, being selectable from a plurality of available billing destinations, in accordance with the routing criteria previously established.

The routing criteria may be determined based on the parameters uniquely associatable with the specific data transaction or, independently of parameters uniquely associatable with the specific data transaction.

The one or more billing destinations may be selected from the following:

a) an account uniquely associatable with the subscriber, updatable by the subscriber, and referenceable by the subscriber database, and/or b) an account uniquely associatable with the subscriber, updatable by the subscriber, and interfaced with another component of the mobile network.

The account is updatable upon the transmission of a data transaction by the subscriber within the telecommunication network.

The routing of the tariff may be effected in the same time frame as the transmission of the data transaction.

The routing of the tariff may be delayed for a predetermined time period so as to enable the grouping of multiple tariffs for subsequent routing to a billing destination.

Suitably, the one or more billing destinations may be adapted to enable communication therebetween, such that any one billing destination can be updated by another billing destination.

In a further embodiment, a method is provided for evaluating a data transaction so as to determine a correct transaction tariff value for the specific data transaction, the method comprising the steps of:

a) receiving a message identifier from at least one messaging platform, the message identifier being associated with a specific data transaction being routed through the messaging platform and having at least one unique identifier associated with a subscriber to the telecommunication network linkable thereto, b) comparing the at least one identifier to a set of identifiers previously defined so as to determine a correct transaction tariff value for the data transaction, c) routing the tariff value determined to one or more tariff destinations, the routing being determined based on the comparison of the at least one identifier with the set of identifiers previously defined, and wherein the determination of the correct tariff value is effected in a multi-step process.

Optionally the step of determining the correct tariff value for the transaction may be effected by applying a set of pre-configurable rules to rating parameters uniquely identifiable with the specific data transaction so as to determine a rating criteria for that data transaction, and comparing that rating criteria to a plurality of pricing criterion to evaluate the correct pricing criteria for that rating criteria, the correct pricing criteria providing the correct tariff value.

The correct tariff value may be further modified by at least one price modifier, the at least one price modifier being definable by a set of rules uniquely associatable with the subscriber, and wherein the modified tariff value is the correct tariff value.

The invention may also desirably provide a system adapted to enable a correct routing of a tariff associated with one or more data transactions in a mobile telecommunication network to an appropriate billing system, the mobile telecommunication network incorporating a data switching centre, the data switching centre being adapted to receive data transactions transmitted by a subscriber to the telecommunication network and route them to an appropriate destination, the system comprising:
  a) means for receiving service detail records from a data switching centre associated with the mobile telecommunication network, the service detail records being associated with a specific data transaction having been previously transmitted by, or to, a subscriber within the telecommunication network, the service detail record containing a unique indicia associated with the subscriber,
  b) means for associating the retrieved unique indicia with one or more records previously stored in a subscriber database so as to establish a routing criteria for the specific subscriber,
  c) means for effecting the calculation of a tariff for the data transaction, and
  d) means for routing the tariff to one or more billing destinations, the billing destinations being selectable from a plurality of available billing destinations, in accordance with the routing criteria previously established.

The invention may also provide a system adapted to enable an evaluation of a specific data transaction so as to determine a correct transaction tariff value for the data transaction, the system comprising:
  a) means for receiving a message identifier from at least one messaging platform, the message identifier being associated with a specific data transaction being routed through the messaging platform and having at least one unique identifier associated with a subscriber to the telecommunication network linkable thereto,
  b) means for comparing the at least one identifier to a set of identifiers previously defined so as to determine a correct transaction tariff value for the data transaction,
  c) means for routing the tariff value determined to one or more tariff destinations, the routing being determined based on the comparison of the at least one identifier with the set of identifier previously defined, and
wherein the system is adapted to effect a determination of the correct tariff value upon implementation of a multi-step process.

The invention may additionally provide a billing and routing module for interfacing with a data switching centre, the module being adapted to evaluate specific data transactions and apply a suitable tariff to those transactions and also determine a suitable billing destination for those transactions, the module comprising:
  a) means for receiving at least one identifier uniquely associatable with a data transaction from the data switching centre,
  b) means for evaluating the data transaction so as to determine a correct tariff rate for that transaction,
  c) means for routing that tariff rate to a billing destination, and wherein the billing destination is selected from a plurality of configurable billing destinations, at least one of which is not co-resident with the module.

These and other features of the present invention will be better understood with reference to the following drawings.

BRIEF DESCRIPTION OF THE DRAWINGS

Accordingly, the present invention will now be described in greater detail with reference to the accompanying drawings in which.

DETAILED DESCRIPTION OF THE DRAWINGS

Figure 1:
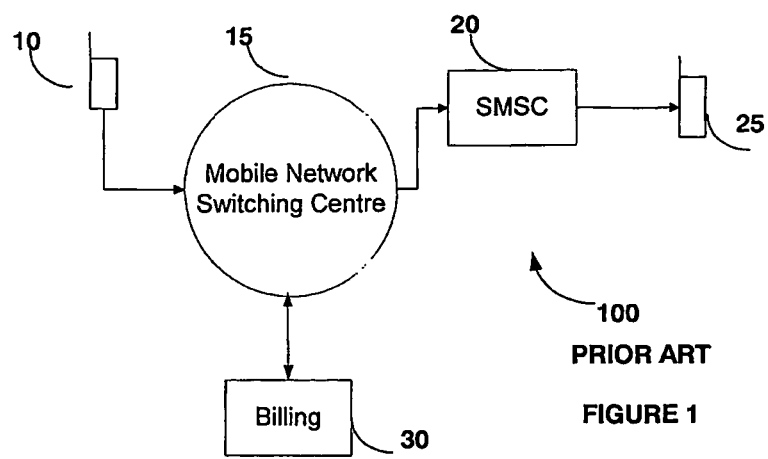
FIG. 1 is a block diagram of a mobile telecommunication network architecture according to the prior art.
Figure 2:
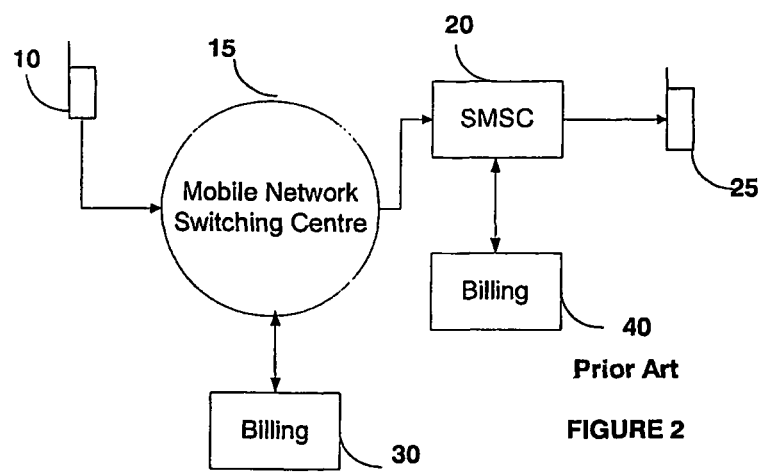
FIG. 2 is a block diagram of a second mobile telecommunication network architecture according to the prior art.

FIGS. 1 and 2 have been described with reference to the prior art.

Figure 3:
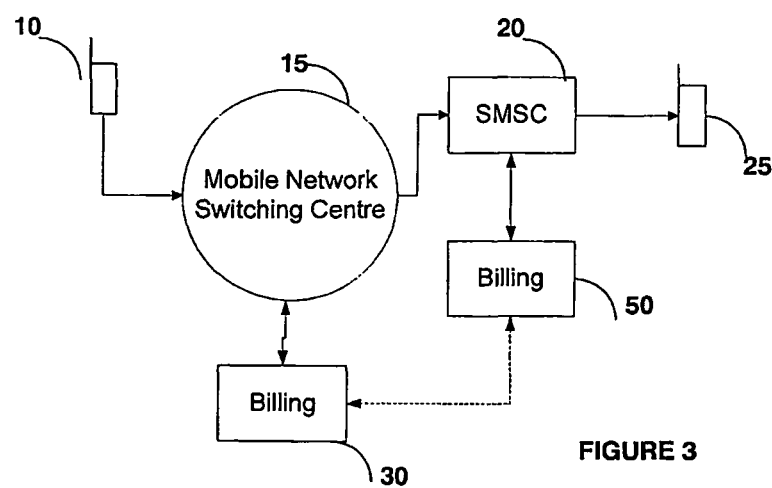
FIG. 3 is a block diagram of a mobile telecommunication network incorporating a billing routing system according to the present invention.

The present invention provides a network architecture incorporating a billing routing system 50, an embodiment of which is detailed in FIG. 3. As shown in FIG. 3, the billing routing system 50 is interfaceable with the conventional SMSC 20 provided in telecommunication networks. However, it is also interfaceable with switching centres such as MMSC and WSB. The billing system 50 of the present invention is adapted to communicate with a conventional voice specific billing system 30. The sequence flow between composition of a data message and receipt of same is similar to that described above in respect of the prior art. The present invention has application to and may be implemented with a variety of mobile data services including for example text or SMS messages, WAP content and multimedia messages. The invention will now be described for the most part with reference to an exemplary embodiment for the billing of SMS data services. It will be appreciated that the generic term "data switching centre" as used within the present specification is intended to define switching centres or messaging platforms such as SMSC, WAP gateway and MM SC. The system of the present invention may be configured for use with both pre- and post-paid subscriber types.

Figure 4:
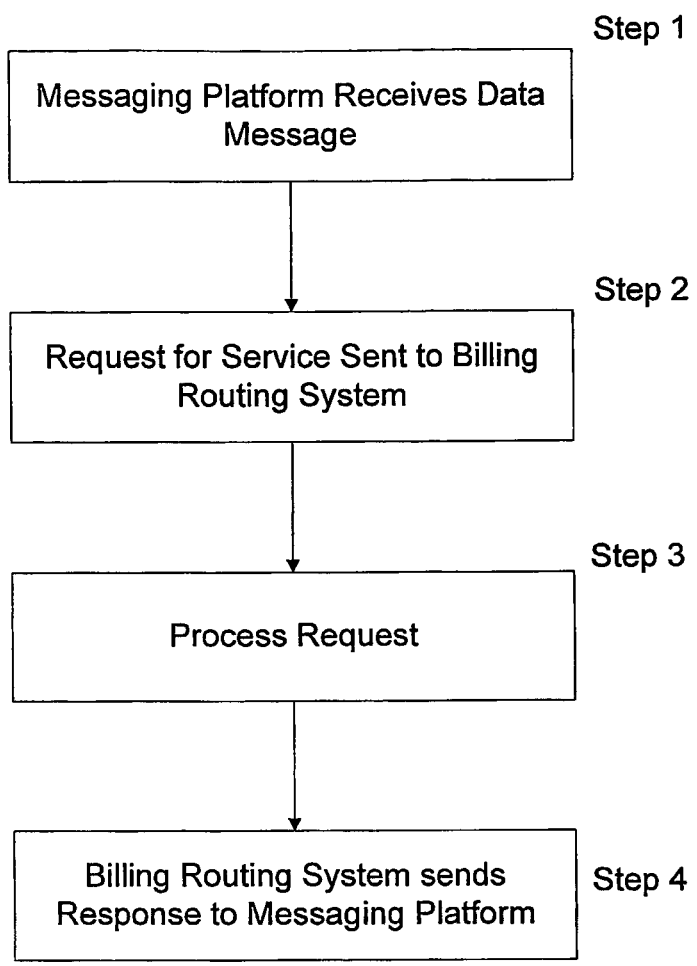
FIG. 4 is a flowchart of a method of implementation of the present invention.

As was described previously with reference to the prior art, when a pre- or post paid customer sends a SMS data message from their mobile phone 10, the message is routed to the SMSC 20. According to the network architecture implementation of the present invention, as shown in FIG. 4, when the SMSC 20 receives the data message (Step 1), the SMSC 20 sends a request for service—a service request—to a billing routing system 50 (Step 2). The billing routing system 50 processes the request (Step 3) and then sends a real-time response signal back to the SMSC 20 (Step 4). The service request may be either a request to allow delivery of the data message, or a request for an advice of the cost for delivery of the data message. The response will either allow or deny delivery of the data message, or advise as to a rate or tariff for the delivery of the data message. The SMSC can then make a decision as to whether to enable the transmission of the data message to the intended recipient, whether to advise the originator of the message that their message will not be sent, or simply to advise them of the cost associated with the requested data transmission and await their further instructions with regard to further transmission.

Upon receipt of a request to allow delivery of the data message from the SMSC 20, the billing routing system 50 will process the request and responds to the SMSC 20 with either a service grant or a service decline. If the billing routing system 50 responds with a service grant, the billing routing system 50 has indicated to the SMSC 20 that it may proceed with its message transmission, while if the billing routing system 50 responds with a service decline, the message is not to be transmitted.

Upon receipt of a request for advice of the cost for delivery of the data message from the SMSC 20 the billing routing system 50 will process the request and respond to the SMSC 20 by advising the cost for delivery of the message, without billing the actual charge. This advice of cost is then routed back to the subscriber. However the advice of charge functionality is typically used by subscribers when wishing to send multimedia messages and WAP content from their phone, rather than for SMS messages.

As detailed above, the system of the present invention may be configured for use with both pre- and post-paid subscribers. Within these two general headings the subscriber classes can be further sub-divided into prepaid subscribers, post-paid subscribers and post-paid subscribers with a credit limit. When a request to allow delivery of the data message from the SMSC 20 is sent, either a service decline or a service grant signal is sent as a response signal by the billing routing system 50, regardless of whether the subscriber is a prepaid or post-paid subscriber. However when the billing routing system 50 is processing the request, the determining factor as to whether to send a service grant or decline for the request varies depending on the type of subscriber.

Figure 5:
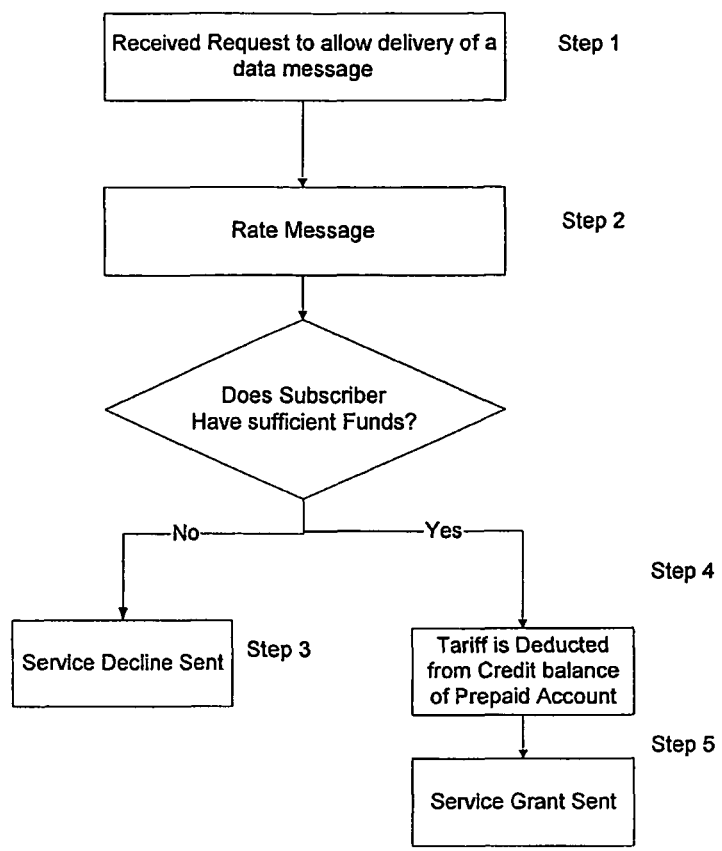
FIG. 5 is a flow chart for the process of servicing a request for a prepaid subscriber.

FIG. 5 illustrates the flow chart for the process of servicing a request for a prepaid subscriber, in accordance with an exemplary embodiment of the present invention. In Step 1 the billing routing system 50 receives the request from the SMSC 20 to allow delivery of the data message. In Step 2 the billing routing system 50 rates the cost of delivery of the data message and verifies whether the subscriber has sufficient funds available in his prepaid account to pay for the delivery of the data message. If the subscriber has insufficient funds available the process moves to Step 3 where a service decline response is transmitted back to the SMSC 20. Alternatively, if the subscriber has sufficient funds available, the process moves to Step 4. Here the tariff is deducted from the credit balance of the prepaid subscribers account. Finally, the process moves to Step 5 where a service grant response is transmitted back to the SMSC 20.

Figure 6:
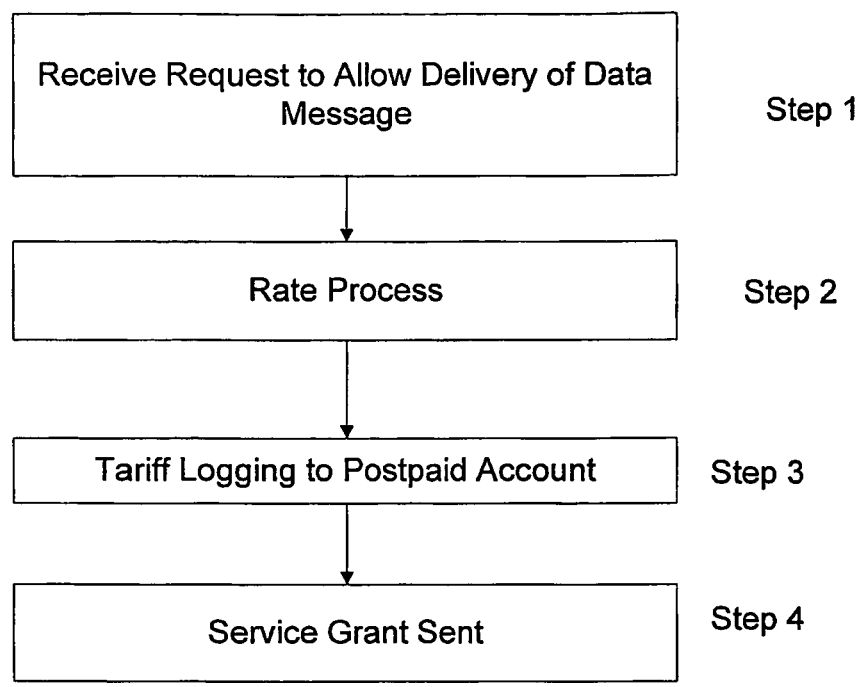
FIG. 6 is a flow chart for the process of servicing a request for a post-paid subscriber.

FIG. 6 illustrates a flow chart sequence for servicing a request for a post-paid subscriber. In Step 1 the billing routing system 50 receives the request to allow delivery of the data message. In Step 2 the billing routing system 50 rates the cost of delivery of the data message. In Step 3 the billing routing system 50 logs the tariff to a post-paid account so as to enable for a charging to the post-paid subscriber's next invoice. The process then moves to Step 4 where a service grant response is transmitted to the SMSC 20.

Figure 7:
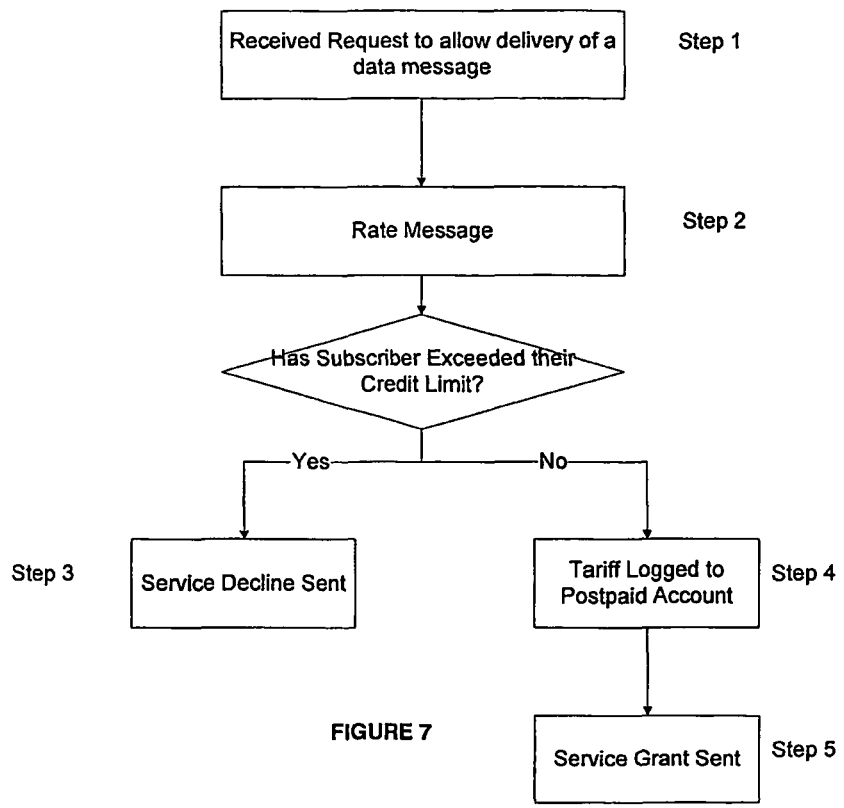
FIG. 7 is a flow chart for the process for a post-paid subscriber with a credit limit.

FIG. 7 illustrates the flow chart for the process for a post-paid subscriber with a credit limit. In Step 1 the billing routing system 50 receives the request to allow delivery of the data message. In Step 2 the billing routing system 50 rates the cost of delivery of the data message and verifies that the subscriber has not exceeded his predefined credit limit for the month, or alternative pre-defined time period. If the subscriber has exceeded his available credit limit the process moves to Step 3 where a service decline response is transmitted back to the SMSC 20. Alternatively, if the subscriber has not exceeded his credit limit, the process moves to Step 4. Here the tariff is logged to a post-paid account for charging to the post-paid subscriber's next invoice. Finally the process moves to Step 5 where a service grant response is transmitted back to the SMSC 20.

In cases where a subscribers account be barred, or in the case where the billing system has no record of such a subscriber, a service decline is always transmitted.

It will be appreciated from the above discussion that the system of the present invention may access one or more accounts of a subscriber prior to allowing or denying the data transactions to be transmitted. These accessed accounts may be selected from one of a number of possible billing or charge destinations—the accounts available for selection depending on the class of subscriber and configuration of the system. For prepaid subscribers, the billing destination includes an internal prepaid data balance colocated with the billing routing system 50 and an external prepaid voice balance which is typically a conventional voice specific account such as those interfaced to a MSC. The tariff is deducted from the selected prepaid credit account for such subscribers.

For post-paid subscribers, the billing destination includes an external post-paid voice account. The tariff that is incurred is simply incremented to a log of transactions for that subscriber for a defined time period so as to enable subsequent billing of the subscriber. The cost of a transaction can be updated immediately to a transaction log residing on the external post-paid voice account or alternatively a log of transactions may be maintained at the billing routing system 50 for an extended time period and then the aggregate charge can be transferred to the external post-paid voice account in a subsequent step.

For post-paid subscribers with a credit limit, the billing destination may also includes an external post-paid voice account. When a post-paid subscriber with a credit limit attempts to send a data message an internally maintained data credit limit balance co-located with the billing routing system 50 is firstly checked to ensure the subscriber has not exceeded his pre-defined credit limit. If not, this balance is charged against and the tariff is subsequently charged in the same manner as for a post-paid subscriber with no credit limit.

A further billing destination that may be configured for access by both post-paid and prepaid subscribers is a loyalty account for subscribers. In this configuration, each subscriber loyalty account may have a loyalty balance, co-located with the billing routing system 50 which may be interfaced with during a data transaction. This loyalty balance may be updated on the basis of the value of the transactions conducted by a subscriber in any one time period, a use of any specific "premium" services which provide a bonus to the user, or the like. Once the balance reaches a certain configurable value, the subscriber is entitled to a free service. The system also may maintain a free service balance. A free service balance is where a subscriber is offered a number of free services should they meet a configurable criterion. When the balance is in credit, each time a data transaction is conducted the free services account balance may be decremented so that the subscriber is only charged for transactions in excess of their predefined free amount.

An example of a loyalty scheme might include the situation where a network operator wished to promote the uptake of a chat service, a promotional offer of 10 free chat transactions for each 50 short messages sent could be offered. Another possible offer could be for each 20 Euro spending or for each individual spend greater than 5 Euro or of first reaching a spend of 100 Euro, 5 free SMS messages or 10 free sports alerts or 2 free multi-media messages or 50 free URL accesses, etc. could be allocated to a subscriber.

By locating user accounts at the billing routing system 50, the present invention enables real time interfacing with these accounts during the time period normally required to transmit a message between a sender and recipient. The invention also provides for an interface between accounts provided at the billing routing system 50 and those maintained externally at the voice network billing system, such that any deficiencies in one or the other may be monitored and compensated for by the other. This enables the system to provide to a user what looks like a single account for all their voice and data transactions, yet have the functionality to be able to discriminate between the two.

By enabling a more efficient real-time billing of a sequence of data transactions the system of the present invention may be adapted to provide for discriminatory billing for data transactions based on their specific characteristics. By providing an intelligent billing system, the present invention is adapted to analyse all types of data services e.g. SMS messages, WAP content, MMS messages etc. It can then rate according to the most appropriate rating parameters for the specific data service. The system of the present invention is adapted so that the rating of the messaging service is influenced by both the values of details associated with the data service and also those details associated with the sender. These rating parameters typically may include the transaction type, time-of-day, day-of-week, interval between two dates, and a subscriber's class of service. For SMS type messages the rating parameters may also include the originator and recipient address, an in-band billing field which allows a ISP indicate a monetary price or tariff code to be applied to a mobile terminated message, and network information. For WAP the rating parameters typically also include the URL, the bearer type, location based services used, security level and push or pull. For MMS other rating parameters such as the type of message, the size of the message, the ASP, and the subscribed service may be taken into account. Although the system may provide for such differentiation, in order to implement it in an efficient manner that will not degrade the performance of the network as a whole in transmission of messages it is necessary for the system to provide for an efficient analysis of the data transactions and the application of a suitable tariff to identified transactions.

The billing routing system 50 provides a number of configurable modes of operation. The routing of the calculated tariff to one or more billing destinations is influenced by the mode of operation of the system. Some modes provide dynamic routing, where a billing destination is determined based on the type of the data message, the subscriber class of service and the calculated tariff. Other modes simply provide static routing, where the one or more billing destinations are pre defined regardless of the values of various parameters. This will be further explained in the description of the routing module in the following pages.

Figure 8:
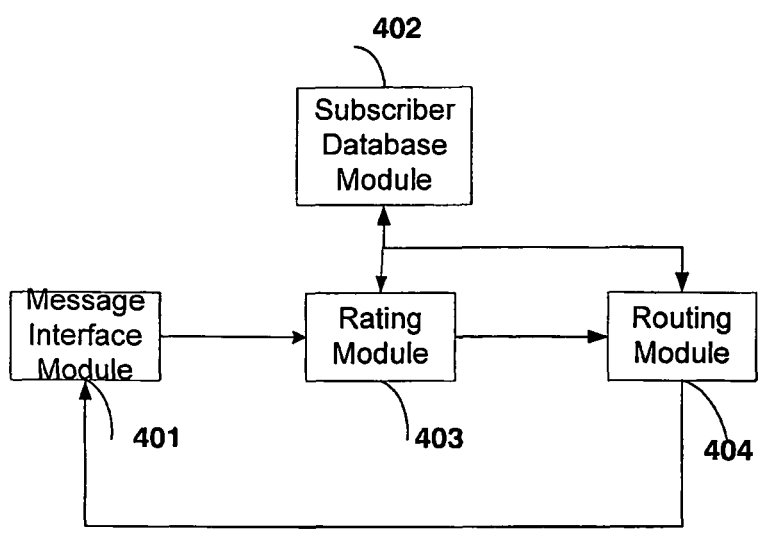
FIG. 8 is a block diagram of the top level architecture for the structure of the billing routing system 50.

FIG. 8 shows a block diagram of the top level architecture for the structure of the billing routing system 50. A message interface module 401 receives a request from a messaging platform 20 to either allow delivery of a data message, or to process an advice of charge. The request is then passed to the rating module 403. The rating module rates the transaction based on the values of a number of pre-defined criteria and calculates an appropriate tariff or rate for that transaction. The calculated tariff is then sent onto the routing module 404. If the request is for an advice of charge, the routing module 404 sends the calculated tariff back to the messaging platform 20. Alternatively, a decision is made as to appropriate billing destinations for the message. The system also maintains a database or datastore 402 which is adapted to store information relating to subscribers of the system. This information is required by both the rating and routing modules of the system.

As the system provides for data service specific rating, it is necessary to be able to discriminate between individual data services. It will be appreciated by those skilled in the art that a variety of message or transaction specific identifiers are associated with each transaction that is routed through a mobile network. The present invention utilises these specific identifiers and is configured such that accompanying the request which is sent to the message interface module 401 are details associated with the data message, for example the originator and destination MSISDN (Mobile Station Integrated Service Data Network). At least one subscriber-unique indicia should be included within these details, in order to identify the sender of the data message. This is typically the MSISDN of the subscriber, as this number is an operator unique identifier. However, when number portability between network operators is not a requirement, the subscriber's IMSI (International Mobile Subscriber Identity) may be used as the unique indicia instead.

The rating module 403 obtains further subscriber details from a subscriber database module 402. This allows the rate to be influenced by both the details associated with the data message, and the subscriber details extracted from the subscriber database module 402.

As previously mentioned, the choice of billing destinations available to the routing module 404 for routing the tariff is determined by the configuration of the system defined in the system configuration module 408. For static configurations, the one or more billing destinations are pre-determined by the selected configuration. However, for dynamic configurations, the choice of billing destination is determined based on factors including but not limited to the data service requested, on the subscriber details extracted from the subscriber database module 402 and/or the calculated rate.

Figure 8A:
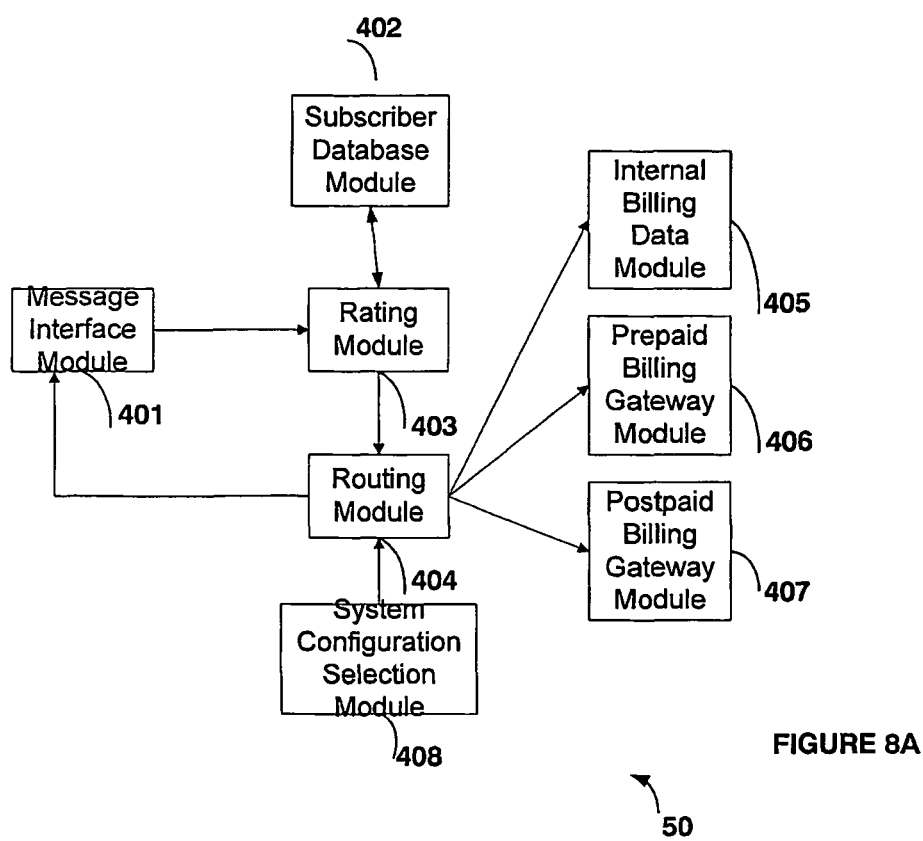
FIG. 8a is a block diagram of the internal structure of the billing routing system 50 detailing all system modules.

FIG. 8*a* shows in more detailed form the internal structure of the billing routing system 50 previously described in FIG. 8. It desirably incorporates at least one message interface module 401, a subscriber database module 402, at least one rating module 403 and at least one routing module 404. If the system is to cater for prepaid subscribers it will include one or more real time prepaid gateway modules 406. Similarly, if it is to cater for post-paid subscribers it will include one or more post-paid billing gateway modules 407. It may also include one or more internal billing data modules 405, for implementation of loyalty schemes and the internal billing of subscribers. The system also includes a system configuration selection module 408. Typically, there will be only one subscriber database module 402 in the billing system. However, there may be more than one message interface module 401, rating module 403, routing module 404, data billing module 405, real time prepaid gateway module 406 and post-paid billing gateway module 407. The number of modules is determined by the system requirements. Typically, each rating module 403 only rates one message type, for example an SMS, MMS or WAP message types.

The data billing module 405 is an internal data billing account. It holds a number of prepaid data transactions account balances. Some of these balances are monetary balances. For example, a monetary balance for a prepaid subscriber corresponds to the amount of credit a prepaid subscriber has available for use for data messaging services. Other balances are plain balances, which hold an integer representation of a money value. For example, for a post-paid subscriber with a credit limit, a plain balance corresponds to the amount of credit a post-paid subscriber has available for use for data messaging within a set time frame. Other balances may include loyalty balances, where the balance corresponds to the number of loyalty points earned.

When a subscriber sends a data message, the cost of the message may be deducted from a monetary balance or a loyalty balance. In configurations that support loyalty schemes, the loyalty balance may be updated each time a subscriber sends a data message or a message of a specific predetermined type.

The real time prepaid gateway module 406 is responsible for interfacing to external voice prepaid accounts. When the routing module 404 determines that the calculated tariff is to be routed to an external voice prepaid account, the tariff is first sent to the real time rating gateway module 406, which in turn forwards the tariff to the appropriate external voice prepaid account.

The post-paid billing gateway module 407 is responsible for interfacing to external post-paid accounts. When the routing module 404 determines that the calculated tariff is to be routed to an external post-paid account, the tariff is sent to the post-paid billing gateway module 407. The tariff is incremented to a log of transactions for that subscriber for a defined time period so as to enable subsequent billing of the subscriber. Depending on the configuration of the system, either the tariff is added to a transaction log which is maintained at the post-paid billing gateway module and the aggregate charge transferred to the subscriber's external post-paid account at intervals, or alternatively the charge may be sent to a transaction log residing at the subscriber's external post-paid account in real time i.e. during each transaction.

Each of the previously described modules will now be described in more detail.

The message interface module 401 is adapted to interface externally with multiple mobile telecommunication messaging platforms 20 such as an SMSC (Short Message Service Centre), Wireless Service Broker (WSB) or Multimedia Messaging Service Centre (MMSC), and internally with the rating module 403. The interface between the system and external components is typically achieved using a communication protocol such as TCP/IP. It receives values for one or more of the parameters associated with the data message and one or more subscriber details associated with the sender of the data message, one of which must be a subscriber-unique indicia, from the messaging platform 20 and passes the information to the rating module 403 for processing. As each rating module 403 may only rate one type of service, the message interface module 401 must also ensure to route to the appropriate rating module 403. Once the service request has been processed, the message interface module 401 transmits the response back to the messaging platform 20. This response may be either a service grant or a service decline signal or a tariff value, the option of response depending on the request sent from the messaging platform 20 (either a request for allow of delivery of the message, or a request for an advice of charge of the message). One of the subscriber details that is transmitted to the message interface module must contains a unique identifier associated with the subscriber such as the subscriber MS-ISDN (Mobile Station-Integrated Service Data Network) or IMSI (international mobile subscriber identity), where number portability is an issue. This unique identifier is required so that further subscriber details may be obtained from the subscriber database module 402. Other parameters that may be sent include for a SMS message, the time, PID (Protocol Identifier), TON (Type of Number), NPI (Numbering Plan Indicator), originating MSC to determine if subscriber is roaming. For WAP the rating parameters typically include the URL, the bearer type, location based services used, security level and push or pull. For MMS other rating parameters such as the type of message, the size of the message, the ASP, and the subscribed service may be taken into account.

The subscriber database module 402 interfaces with the rating module 403. It acts as a repository for subscriber static data. This is the data regarding the subscriber that should remain relatively stable over the subscriber's subscription. The subscriber database module 402 contains a mapping from a subscriber IMSI to a record which includes the subscriber's class of service (e.g. business, personal) and the address of the subscriber's data billing module 405 and either the address of the subscriber's prepaid billing gateway module 406 (if the subscriber is a prepaid subscriber) or the address of the subscriber's post-paid billing gateway module 407 (if the subscriber is a post-paid subscriber).

The rating module 403 rates the service transaction. The rate is influenced based on a number of rating parameters. These parameters include data message details passed from the message interface module 401, as well as subscriber information obtained from the subscriber database module 402. Typically, the rating parameters may include the time-of-day, day-of-week and interval between two dates. For SMS the rating parameters may also include the originator and recipient address, an in-band billing field, which allows a service provider to indicate a monetary price or tariff code to be applied to a mobile terminated message, and network information. For WAP the rating parameters typically include the URL, the bearer type, location based services used, security level and push or pull. For MMS other rating parameters such as the type of message, the size of the message, the ASP, and the subscribed service may be taken into account.

Each transaction may be rated in accordance to specific rating scheme known as a tariff plan. Once the rating parameters are extracted for a transaction, the rating module 403 identifies the most appropriate tariff plan to rate the transaction. This tariff plan is then invoked with the supplied rating parameters. The tariff plan then processes the information and returns the calculated price.

The most appropriate tariff plan to rate the data transaction is selected based on the subscriber's class of service and/or Large account/content provider in the case of MMS or SMS mobile terminated. For example, there would typically be SMS, MMS and WAP related tariff plans, with each class of tariff plan being tailored to rate for the specific data service. The SMS tariff plan class typically may be subdivided into three further categories of SMS services—Large Accounts Tariff Plans, Subscriber Tariff Plans and Additional Services Tariff Plans. The MMS Tariff plan class typically may be subdivided into three further categories—MSISDN Tariff Plans, E-mail Tariff Plans and Value Added Service Tariff Plans.

In order to rate the transaction in an efficient time frame, the present invention provides for a multi-process rating process within the selected tariff plan. Such a multi-process rating is typically calculated in two or three steps, the number of steps invoked depending on the tariff plan. The following descriptions of each step apply to all the tariff plans, however as explained above some tariff plans will only invoke 2 of the 3 described steps.

In Step 1 the values for the rating parameters are input into one or more processes for determining classification values for the data transaction. A classification value is determined by applying a set of pre-defined configurable rules to the values of the rating parameters that are specific to the data transaction. The classification value is used as an input to the process of Step 2, where a value for the tariff is calculated, along with the primary balance from which the price is to be debited and a secondary balance mask, which indicates a number of balances to which the value can be overflowed if there is insufficient credit available in the primary balance. The value is obtained through the use of a look up table. Depending on the tariff plan invoked for each transaction, the value may be further modified in Step 3.

In Step 3, the value is further modified to take account of the values of other rating parameters for that specific transaction, to formulate the actual tariff to be charged for the transaction.

Typically, an SMS tariff plan may invoke Steps 1 and 2, while WAP and MMS tariff plans invokes Steps 1-3.

The main benefit of the above described stepped approach to rating the transaction is in processing speed. The use of look up tables and pre-defined rules shortens the processing time when compared with a conventional method of rating, in which all variables are input to one logic block where the final tariff is calculated.

Figure 9:
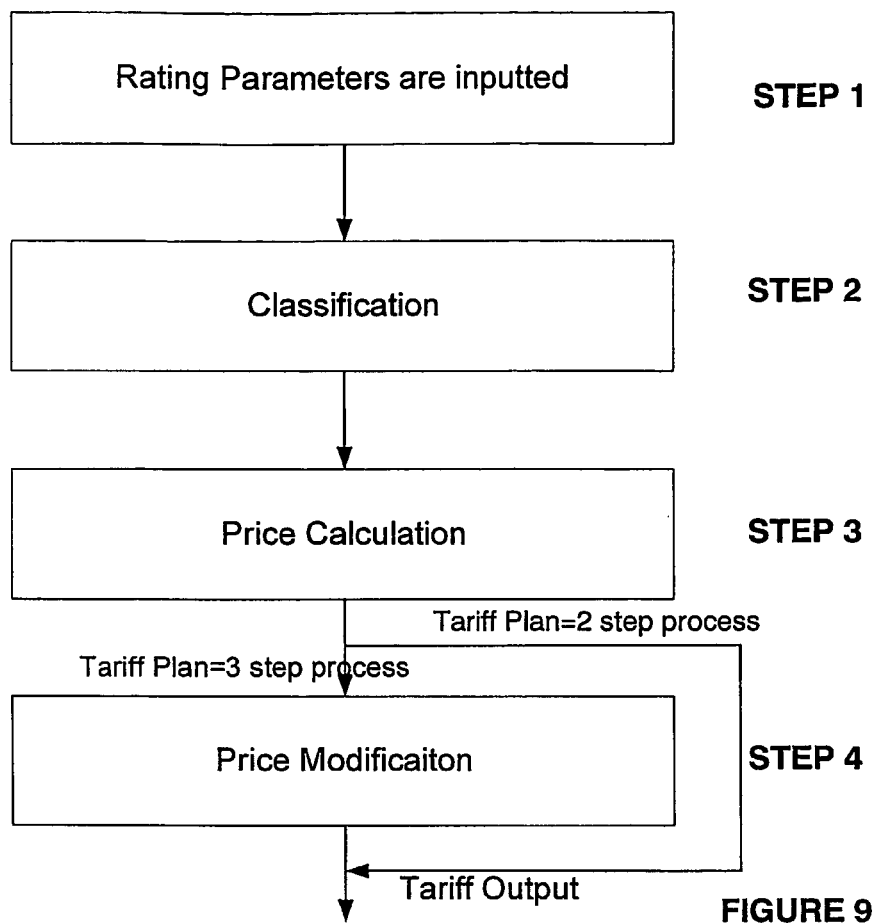
FIG. 9 is a flow chart for a typical tariff plan.

The process is further described below and illustrated in the flow chart of FIG. 9. Step 1 involves the determination of a number of classification values to be used in the rating process. These classification values are then passed to Step 2, where they are used to calculate a price using a pricing matrix. Optionally in Step 3 the price may be modified to take account of the class of service of the subscriber.

In Step 1 a classification scheme is applied to a specific transaction. The classification scheme results in a classification value. A classification value is determined by applying a set of rules to the values of a number of rating parameters. Each rule comprises a conditional expression with the rating parameters malting up the expression variables. For example a classification scheme x could be specified as follows for a set of parameters A, B and C.

1. If A=12 and B<4 and C="don't care" then classification is LOW
2. If A<2 and B>5 and C=27 then classification is MEDIUM
3. If A>12 and B="don't care" and C=0 the classification is HIGH etc.

A typical example of a classification scheme is a time banding classification. Such a scheme may be implemented as follows:

If time>6.00 pm Friday and time<8.00 Monday then timeband is weekend
If time>8.00 am and time<6.00 pm then timeband is peak
If time>6.00 pm and time<8.00 am then timeband is off peak The classification value is determined for the classification scheme by evaluating each expression or rule until one rule evaluates to true. This classification value is then the value of the classification defined for this rule.

Figures 10, 11:
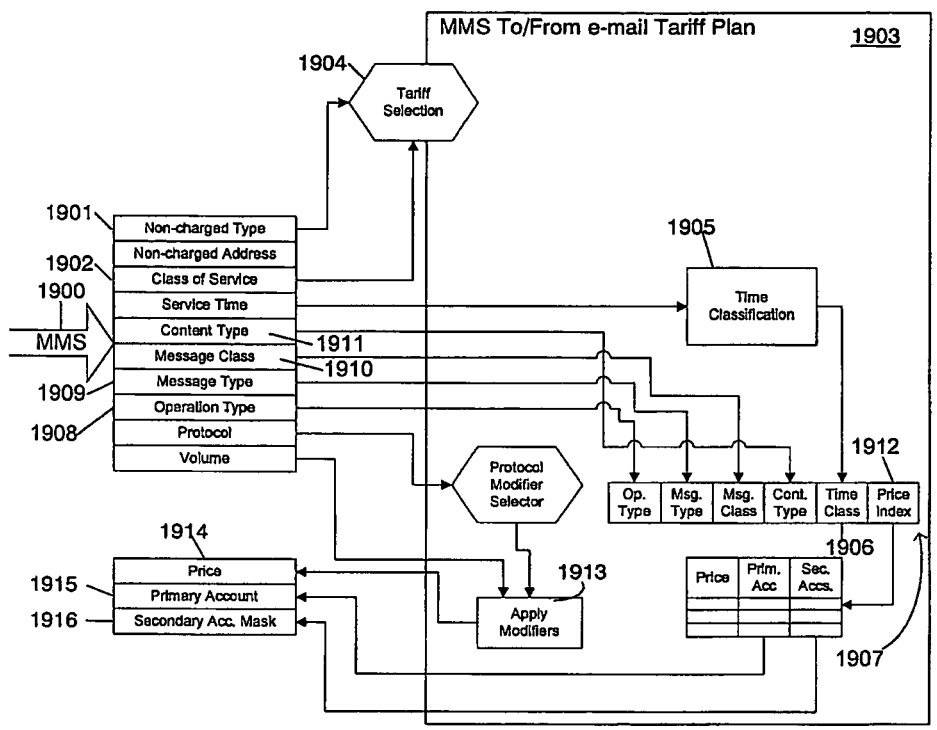
FIG. 10 is an example of a typical pricing matrix as provided by the present invention.
FIG. 11 is a block diagram of an exemplary process flow for an MMS To/From e-mail Tariff Plan.

Step 2 involves the use of a pricing matrix to determine the price. FIG. 10 shows an exemplary pricing matrix suitable for use by the present invention. It includes a set of rows and columns. Each row or rule of the matrix consists of a set of values defined for each classification parameter, a price, and details of the primary balance from which the price is to be debited and the secondary balance mask. In this step, the values for each classification parameter in each row or rule are examined until a row is found where the values match the values of the classification parameters determined in the classification schemes of Step 1. The price is then obtained from the value given in the price column for the matching row. Taking the example of FIG. 10, if the price calculator was invoked with X=C, Y=D, Z=G, then the price would be 2. The output of this process is a value which depending on the tariff plan invoked, may need to be modified to produce a more exact tariff. However the advantage of calculating this value in the 3 step process initially is that a preliminary value can be quickly calculated, thus reducing the overall processing time required to calculate the actual tariff.

For the 3 step tariff plans, in Step 3 the price obtained from the price calculation matrix may be modified to take into account the values of other rating parameters defined for that service, to obtain the actual tariff to be charged. For example, the modifier may for an MMS message adjust a price for message volume (i.e. multiply message charge by message size expressed in megabytes), or for an SMS message add an additional charge for a service carried out (i.e., send a confirmation of receipt of the SMS, add 10 c). This modification is performed by using a set of rules in a similar way to the rules used in the classification schemes of Step 1, however instead of producing a classification, a modifier for the price is calculated. Example of modifiers are "add 2" or "multiply by 3". As in the case of the rules in Step 1, each rule defines a condition. Each rule in this price modification scheme is applied until a rule is evaluated as being true. The modifier associated with the rule is then output by the scheme. It will be appreciated that the output of the pricing matrix in Step 2 of a 3 step tariff plan is in effect a coarse value, whereas the modification of this output in Step 3 by the application of the rules more finely tunes or determines the correct price or tariff to be applied to the specific transaction The calculated tariff from the selected 2 or 3 step tariff plan is then passed to the routing module 404. Here the routing module either selects the appropriate billing destination to charge the rate, or alternatively, when the request is for an advice of charge only, it passes the rate to the message interface module 401 to be sent back to the telecommunication messaging platform 20.

FIG. 11 shows a block diagram of an exemplary process flow for an MMS To/From e-mail Tariff Plan. In this example, the values of the rating parameters for a subscriber's incoming MMS message 1900 are extracted and based on the type of message 1901 and the class of service 1902 of the subscriber the MMS Tariff plan 1903 is chosen 1904 as the most appropriate Tariff Plan to invoke for rating the data service. A time classification scheme 1905 is implemented to evaluate a time classification value 1906. In the pricing matrix 1907 the row is determined whose values for operation type 1908, message type 1909, message class 1910, content type 1911 and the time classification value 1906 for the transaction correspond to those values for the data transaction. The value for the price index 1912 defined for this row is then obtained. This price index 1912 is then modified 1913 to obtain the actual price 1914. This price 1914, along with the primary balance from which the price is to be debited 1915 and the secondary balance mask 1916 to be used if the primary account is exhausted, is the passed to the routing module 404. Here the appropriate billing destination to charge the rate is selected, or alternatively, when the request is for an advice of charge only, the rate is passed to the message interface module 401 to be sent back to the telecommunication messaging platform 20.

In this example of implementation of the system of the present invention, the routing module 404 interfaces to six internal system modules: namely the subscriber database module 402, the message interface module 401, the rating module 403, the internal data billing module 405, the prepaid billing gateway module 406 and the post-paid billing gateway module 407. It will be appreciated, however, that the number of system modules detailed is exemplary of a preferred embodiment of the present invention and it is not intended to limit the invention to any specific number or implementation.

As detailed previously, this module is responsible for routing the tariff to one or more billing modules. The choice of billing modules that may be selected is determined by the selected configuration of the system. The billing module may be one or more of the internal data billing module 405, the prepaid billing gateway module 406 and the post-paid billing gateway module 407. The selected configuration of the system defines whether the routing module will perform static or dynamic routing. In the static modes of operation, the billing module or modules where the tariff is to be billed are already specified. In the exemplary modes of operation described in the system configuration selection module 408 below, this would be the case for the prepaid direct charging mode and the post-paid direct charging mode.

In a dynamic mode of operation, the most appropriate billing destination is determined by means of dynamic routing. In the exemplary modes of operation described in the system configuration selection module 408 below, this would be the case for the modes prepaid transaction aggregation and direct charging mode, prepaid transaction aggregation and direct charging mode with loyalties and post-paid with internal account for certain service types mode. In dynamic routing the choice of billing module to route the tariff to is typically determined by taking into account the tariff calculated in the rating module 403, and a combination of the values of the data message parameters received from the messaging platform 20 via the message interface module 401 and the information contained in the subscriber database module 402. These parameters may include for example the transaction service type, class of service and message trajectory (e.g. Large Account (LA) to Mobile Terminated (MT), Mobile originated (MO) to Mobile terminated (MT), Mobile originated (MO) to large account (LA) etc.).

For example, in the case of a prepaid subscriber, if the tariff was calculated to be below a certain configurable threshold, the dynamic routing could determine that the tariff should be charged to the subscriber's internal data account, and therefore the tariff would be routed to the internal data billing module 405 for charging. Alternatively, if the tariff was calculated to be above a certain configurable threshold, the dynamic routing could determine that the tariff should be charged directly to the subscriber's prepaid external voice account, and the tariff would be routed to the prepaid billing gateway module 406.

The routing module also acts as an intermediary in the case of an advice of charge request. It passes the calculated rate from the rating module 403 to the message interface module 401 for sending onto the messaging platform. It also passes the service request and grant signals to the message interface module 401 from the billing gateway modules.

The internal data billing module 405 interfaces with the routing module 404. It has the responsibility of maintaining the subscriber records and servicing requests on these records, including the administering of loyalty schemes. The internal data billing module 405 maintains records for the subscribers account balances for data transactions. Each subscriber record typically may contain up to two to the power of n account balances (where n is an integer), for efficiency, and a class of service field. In our exemplary embodiment, 32 balances are provided. The balances can be any combination of plain, validity, service and loyalty balances.

A plain balance may hold integer representation of moneys, for example in the case a post-paid subscriber with a credit limit, a plain balance corresponds to the amount of credit a post-paid subscriber has available for use for data messaging within a set time interval A service balance may hold integer representation of a number of services, for example a number of free transactions that the subscriber may use. Validity balances are derived from plain and service balances. They have two extra fields associated with them; a start date and an end date, representing that the moneys or services will only be valid between the two dates. A loyalty balance is a balance that increases every time a subscriber uses a service, (provided the system is so configured). The loyalty balance will increase until the subscriber reaches a configurable threshold where the balance may be used to redeem a free service etc.

The internal data billing module 405 can also initiate a reload on a subscriber account balance in situations such as whenever the account approaches exhaustion. A reload transfers credit from the subscriber's prepaid external voice account to the subscriber's internal data account within the internal data billing module 405. This reload may be effected through accessing an external money repository which may be provided by the subscriber's external voice account.

The instructions received from the routing module 404 determine which account balances are to be debited or credited. In some cases, the internal data billing module 405 will only be used to manage the loyalty balances, with all tariffs charged to either an external voice prepaid account or an external post-paid account. However the internal data billing module 405 may be used for micro-transaction aggregation, in which case it holds representative monetary values. In this case, the tariff for a data message transmitted by a prepaid subscriber is charged by deducting the value from a selected plain balance. The internal data billing module can also be used in the case of post-paid subscribers with a credit limit, for tracking credit limits. When a post-paid subscriber with a credit limit attempts to use a data service, the subscriber's credit limit account balance is checked that the subscriber has sufficient credit to make the transaction. If there is sufficient credit available, this balance is charged against and the charge is subsequently routed for logging as per a post-paid subscriber with no credit limit. In the event that the post-paid subscriber has insufficient credit balance available (i.e. they have exceeded their credit limit), the transaction is refused.

The prepaid billing gateway module 406 interfaces with the routing module 404 and the external voice prepaid account 30. It receives debit requests from the routing module 404 to debit the tariff calculated in the rating module 403 from the external prepaid voice account. The prepaid billing gateway module 406 then queues these requests for submission to the external prepaid voice account 30. The external voice prepaid account then checks if the subscriber's prepaid voice account has sufficient funds. If this account does not have sufficient funds, the prepaid billing gateway module 406 returns a service decline response. However if the account does have sufficient funds, the tariff is routed to the external voice prepaid account 30 to be charged and a service grant response is returned. The response is passed via the routing module 404 to the message interface module 401 for transmission to the telecommunication messaging platform 20.

The post-paid billing gateway module 407 interfaces with the routing module 404 and the external post-paid voice account. It receives the tariff calculated in the rating module 403 from the routing module 404 for charging and logs the transaction. This is carried out regardless of whether the tariff was covered by the subscriber's loyalties or not. Depending on the configuration of the system, the transaction can be logged to a log file, and this log file is later batch processed by the external post-paid system in the same manner as voice transactions are processed, or alternatively the transaction is sent for logging to the external post-paid voice account in real time.

The system configuration selection module 408 provides the user with a choice of a number of modes of operation. Typically, only one mode of operation is selectable at a time. The choice of mode of operation influences the operation of the routing module 404. If a static mode of operation is chosen, the billing destination or destinations where the tariff is to be routed is pre-defined, and is independent of the data transaction details, the calculated rate or the subscriber's class of service. However if a dynamic mode of operation is chosen, the routing module 404 will determine the most appropriate billing destination by taking into account the transaction details, the calculated rate and the subscriber's class of service. The choice of system configuration also determines whether or not a loyalty scheme is to be maintained.

Each mode of operation may provide the functionality of one or more of the individual modules. It will be appreciated by those skilled in the art that the modes of operation are exemplary modes of operation. However an additional or reduced number of modes of operation could be provided without altering from the spirit of the invention.

The following is an exemplary list of modes of operation:

Prepaid direct charging mode: Direct charging of all transactions to an external prepaid voice account, with no loyalties or free allocation maintenance.

Prepaid direct charging mode with loyalties: Direct charging of all transactions to an external prepaid voice account, except where the tariff is covered by loyalties or free allocation. The internal data billing module manages loyalties and free issue.

Prepaid transaction aggregation and direct charging mode: Some transactions are aggregated within the internal data billing module, others are charged directly to the external prepaid voice account. This is a dynamic routing configuration, where factors such as message trajectory, class of service, service type and cost can determine the routing of the transaction. No loyalty or free issue is maintained.

Prepaid transaction aggregation and direct charging mode with loyalties: All transactions are routed to internal data billing module for loyalty tracking. Unless the transaction cost is covered by the loyalties, some transactions are aggregated within the internal data billing module, others are charged directly to the external prepaid voice account. This is again a dynamic routing configuration, where factors such as message trajectory, class of service, service type and cost can determine the routing of the transaction.

Post-paid direct charging mode: All transactions for post-paid subscribers are routed to directly to the external post-paid voice account, either in real time, or in a batch process.

Post-paid direct charging mode with credit limit : A running credit level is maintained for post-paid subscribers for a billing period. If this is exceeded the transaction is refused. The transaction is optionally routed to the post-paid gateway to log it as a refused transaction. If the credit limit is not exceeded, the tariff is routed for charging directly to the external post-paid voice account, either in real time, or in a batch process.

Post-paid direct charging mode with credit limit and loyalties: The same as the latter mode, but loyalty information is maintained on the internal data billing module also. Loyalties and free issue can be used to pay for transactions. The tariff is however still forwarded to the post-paid billing gateway module for logging, regardless of whether the transaction was covered by loyalties or not.

Post-paid with internal account for certain service types mode: This is similar to the latter mode, except that the internal data billing module holds an account for certain service types (such as MMS), against which such transactions are charged. For all other service types, the operation is the same as the latter. This is again a dynamic routing configuration, where the dynamic behaviour based on the service type.

Prepaid and Post-paid mode: The preferred configuration of the system is a configuration where the system may handle prepaid and post-paid subscribers. The mode can be a combination of any of the above described prepaid and post-paid modes.

All configurations can process an advice of charge request from the messaging platform. This is whereby the message is rated and the charge is returned to the messaging platform without the transaction being routed to any billing module.

The system will now be described in greater detail, with reference to the exemplary mode of operations for an SMS message type.

Figure 12:
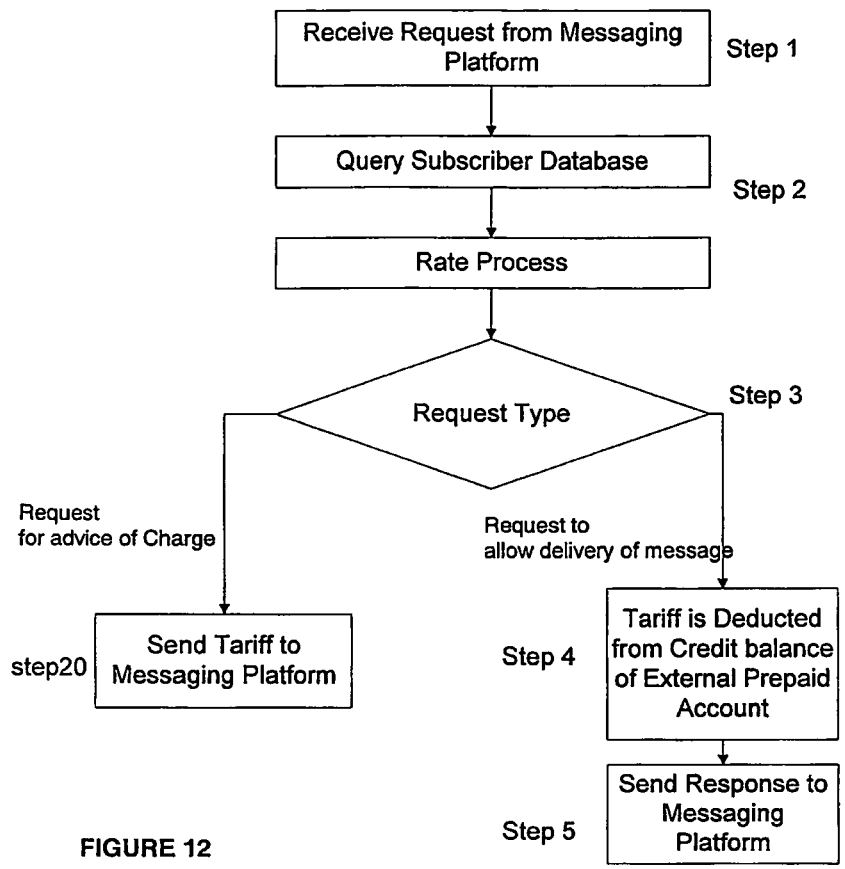
FIG. 12 is a process flowchart for the Prepaid direct charging mode.

FIG. 12 is a process flowchart for the implementation of a prepaid direct charging mode. In Step 1 the billing routing system 50 receives a request from the messaging platform 20 at its message interface module 401. Included in this request will be details associated with the data message corresponding to the request. For an SMS message type, these details may include the originator and destination IMSI, time, PID (Protocol Identifier), TON (Type of number), NPI (Numbering plan indicator) and originating MSC. A subscriber-unique indicia must always be sent with the request. Typically, this is in the form of the subscriber IMSI. However, if number portability is not an issue, the subscriber MSISDN may be used instead. This information is then mapped from external to internal representation and the request is passed to the rating module.

In Step 2 the rating module 403 extracts the subscriber information from the details associated with the data message and generates a query to the subscriber database module 402 to access the subscriber's account information. The subscriber database module 402 replies with the information that is contained in its database; this includes the subscriber's class of service and the address of the subscriber's prepaid billing gateway module 406.

In Step 3 the rating module 403 combines the data message information with the subscriber information obtained from the subscriber database module 402 and submits the information to the most appropriate tariff plan as explained above to calculate the rate. The routing module 404 then determines what type of request was received from the messaging platform 20. If the request was simply an advice of charge request, the process moves to Step 20 and responds to the messaging platform 20 with the calculated tariff. Otherwise, if the request was a request to allow delivery of a message, the process moves to Step 4.

In Step 4 the calculated tariff is routed to the prepaid billing gateway interface module 406. Here the transaction is queued. When the transaction reaches the top of the queue, it is translated to a form supported by the external prepaid voice billing system 30 and transmitted to it.

In Step 5 the external prepaid voice billing system 30 replies with either a success or failure. The reply is translated to internal representation and forwarded to the routing module 404. The routing module 404 forwards the reply to the message interface module 401, who in turn sends it back to the messaging platform 20, either as a service grant or a service decline signal.

Figure 13:
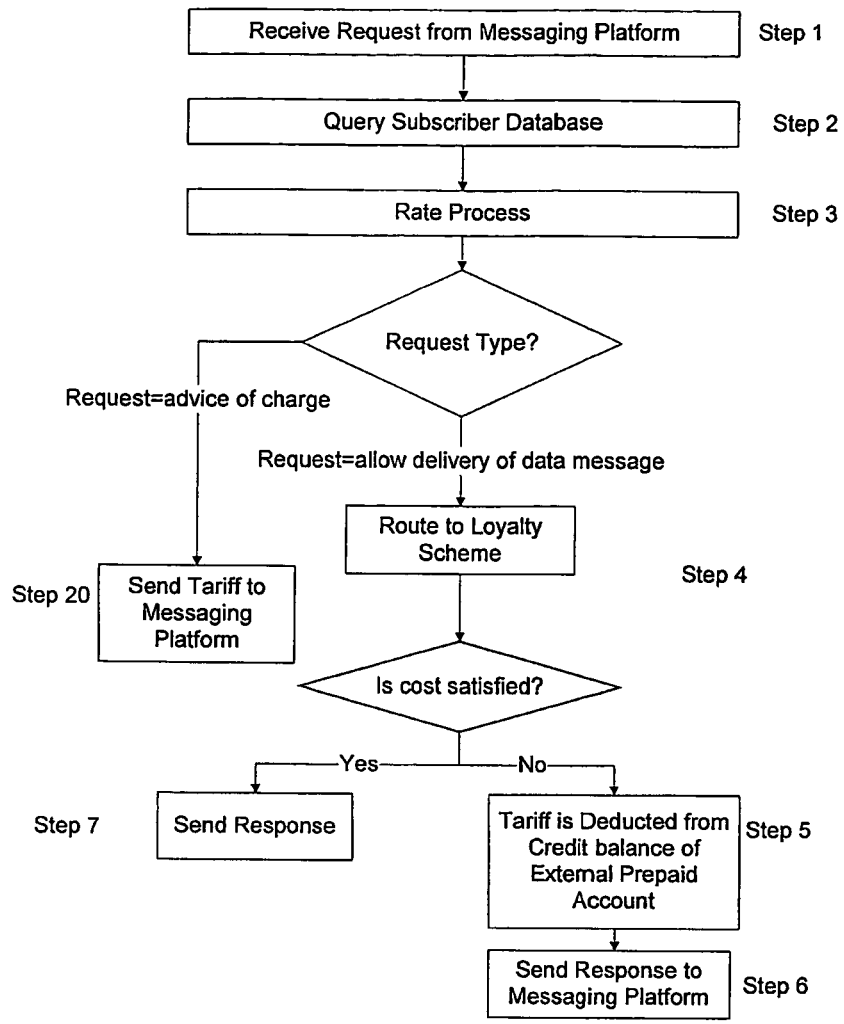
FIG. 13 is a process flowchart for an alternative embodiment, the provision of Prepaid direct charging mode with loyalties.

FIG. 13 is a process flowchart for an alternative embodiment, the provision of prepaid direct charging mode with loyalties. In Step 1 the billing routing system 50 receives a request from the messaging platform 20 at its message interface module 401. Included in this request will be details associated with the data message corresponding to the request. For an SMS message type, these details may include time, PID, TON, NPI and originating MSC. A subscriber-unique indicia must also be sent with the request. Typically this is in the form of the subscriber IMSI, however as detailed above the subscriber's MSISDN can be used if portability is not an issue. This information is then mapped from external to internal representation and the request is passed to the rating module 403.

In Step 2 the rating module 403 extracts the subscriber information from the details associated with the data message and generates a query to the subscriber database module 402 to access the subscriber's account information. The subscriber database module 402 replies with the information that is contained in its database; this includes the subscriber's class of service, the address of the subscriber's prepaid billing gateway module 406 and the address of the subscriber's internal data billing module 405.

In Step 3 the rating module 403 combines the data message information with the subscriber information obtained from the subscriber database module 402 and submits the information to the most appropriate tariff plan as explained above to calculate the rate. The routing module 404 then determines what type of request was received from the messaging platform 20. If the request was simply an advice of charge request, the process moves to Step 20 and responds to the messaging platform 20 with the calculated tariff. Otherwise, if the request was a request to allow delivery of a message, the process moves to Step 4.

In Step 4 the calculated tariff is routed first to the subscriber's account within the internal data billing module 405. If the subscriber has sufficient balance in his service or loyalty balances, the cost of the service may be covered. In this case an amount equivalent to the service or the cost of the service is deducted from the free or loyalty balance. The process then moves to Step 7, where a service grant is transmitted to the messaging platform 20.

In cases where the loyalty or service balances are not sufficient to pay for the transaction, the process moves to Step 5 and the tariff is routed to the prepaid billing gateway interface module 406. Here the transaction is queued. When the transaction reaches the top of the queue, it is translated to a form supported by the external prepaid voice billing system 30 and transmitted to it.

In Step 6 the external prepaid voice billing system 30 replies with either a success or failure. The reply is translated to internal representation and forwarded to the routing module 404. If the reply is success, the loyalty balance within the internal data billing module 405 is updated to include loyalties received for using the service. The routing module 404 forwards the reply to the message interface module 401, who in turn sends it back to the messaging platform 20, either as a service grant or a service decline signal.

Figure 14:
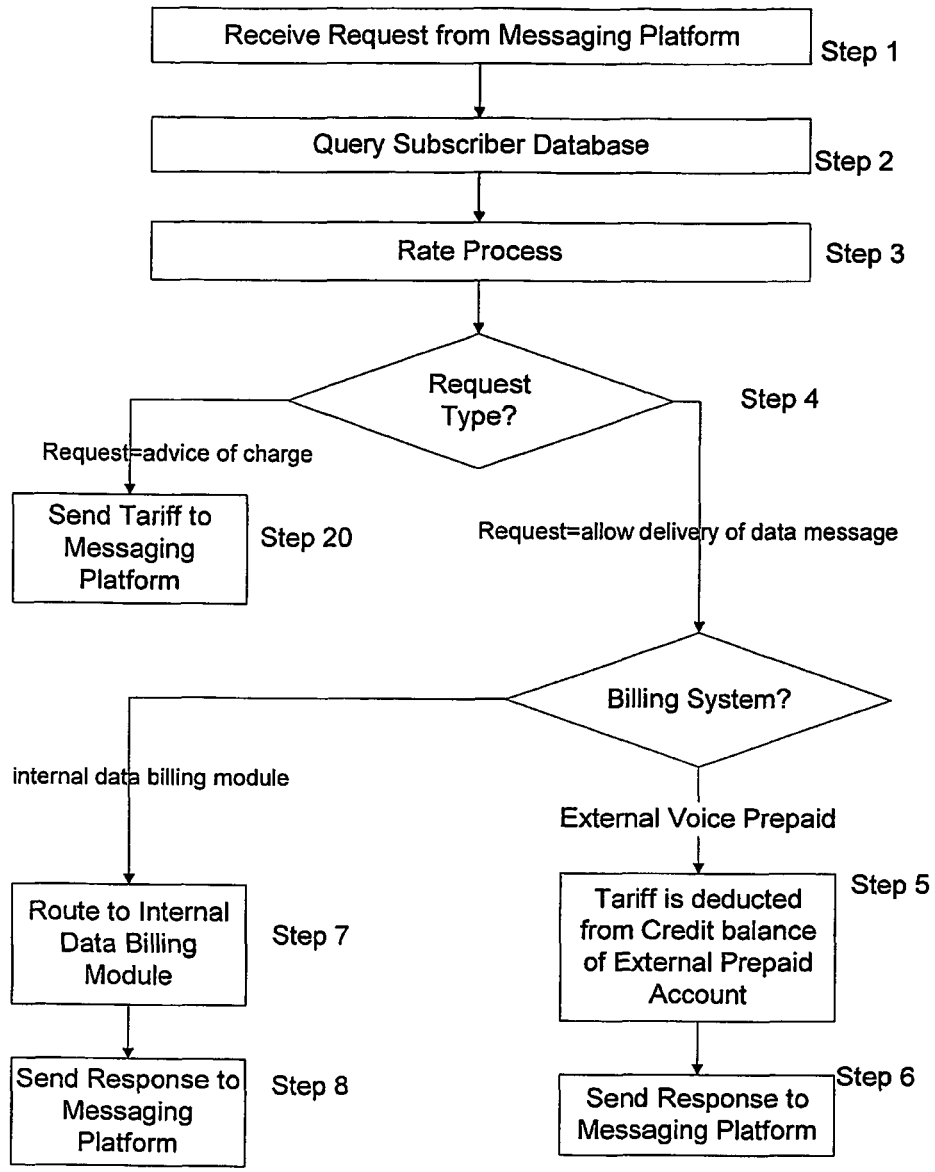
FIG. 14 is a process flowchart for an alternative embodiment, the provision of Prepaid transaction aggregation and direct charging mode.

FIG. 14 is a process flowchart for an alternative embodiment, the provision of prepaid transaction aggregation and direct charging mode. In Step 1 the billing routing system 50 receives a request from the messaging platform 20 at its message interface module 401. Included in this request will be details associated with the data message corresponding to the request. For an SMS message type, these details may include the time, PID, TON, NPI and originating MSC. A subscriber-unique indicia must also be sent with the request. Typically this is in the form of the subscriber .IMSI, however the subscriber's MSISDN can be used if portability is not an issue. This information is then mapped from external to internal representation and the request is passed to the rating module 403.

In Step 2 the rating module 403 extracts the subscriber information from the details associated with the data message and generates a query to the subscriber database module 402 to access the subscriber's account information. The subscriber database module 402 replies with the information that is contained in its database; this includes the subscriber's class of service, the address of the subscriber's prepaid billing gateway module 406 and the address of the subscriber's internal data billing module 405.

In Step 3 the rating module 403 combines the data message information with the subscriber information obtained from the subscriber database module 402 and submits the information to the most appropriate tariff plan as explained above to calculate the rate. The routing module 404 then determines what type of request was received from the messaging platform 20. If the request was simply an advice of charge request, the process moves to Step 20 and responds to the messaging platform 20 with the calculated tariff. Otherwise, if the request was a request to allow delivery of a message, the process moves to Step 4.

In Step 4 the calculated tariff is routed to the routing module 404. Here it is determined which is the most appropriate billing system to route the tariff, either the internal data billing module 405, or the prepaid billing gateway module 406. This is typically determined by taking into account the tariff calculated in the rating module 403, and a combination of the values of the data message parameters received from the messaging platform 20 via the message interface module 401 and the information contained in the subscriber database module 402. These parameters may include for example the transaction service type, class of service and message trajectory (e.g. LA to MT etc.). If the routing module 404 determines that the most appropriate billing module is the prepaid billing gateway module 406, the process moves to Step 5. However if the routing module determines that the most appropriate billing module is the internal data billing module 405, the process moves to Step 7.

In Step 5 the tariff is routed to the prepaid billing gateway module 406. Here the transaction is queued. When the transaction reaches the top of the queue, it is translated to a form supported by the external prepaid voice billing system 30 and transmitted to it.

In Step 6 the external prepaid voice billing system 30 replies with either a success or failure. The reply is translated to internal representation and forwarded to the routing module 404. The routing module 404 forwards the reply to the message interface module 401, who in turn sends it back to the messaging platform 20, either as a service grant or a service decline signal.

In Step 7 the tariff is routed to the internal data billing module 405, along with an indication of the preferred balances from which the cost is to be debited, and a set of alternative balances should there be insufficient capacity in the preferred one.

In Step 8 the internal data billing module 405 responds with either a success or failure indication. The rating module 403 forwards the response to the message interface module 401, who in turn sends it back to the messaging platform 20, either as a service grant or a service decline signal.

Figure 15:
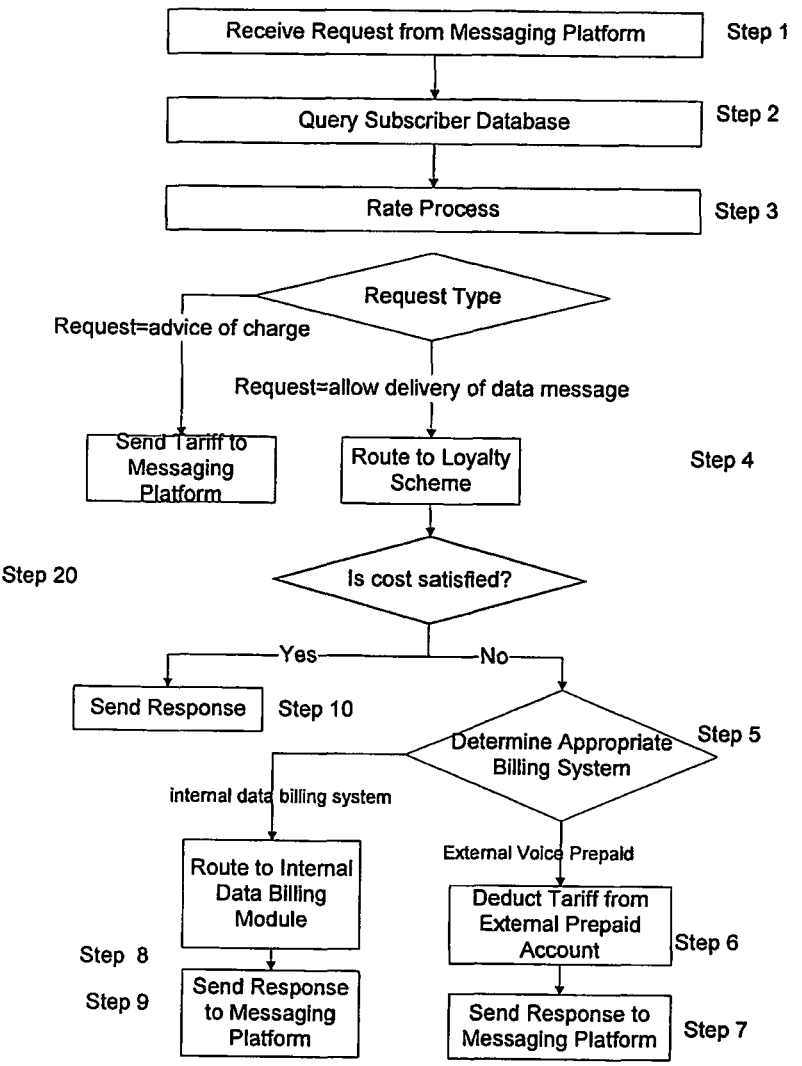
FIG. 15 is a process flowchart for an alternative embodiment, the provision of Prepaid transaction aggregation and direct charging mode with loyalties.

FIG. 15 is a process flowchart for an alternative embodiment, the provision of Prepaid transaction aggregation and direct charging mode with loyalties. In Step 1 the billing routing system 50 receives a request from the messaging platform 20 at its message interface module 401. Included in this request will be details associated with the data message corresponding to the request. For an SMS message type, these details may include the time, PID, TON, NPI and originating MSC. A subscriber-unique indicia must also be sent with the request. Typically this is in the form of the subscriber IMSI, however the subscriber's MSISDN can be used if portability is not an issue. This information is then mapped from external to internal representation and the request is passed to the rating module 403.

In Step 2 the rating module 403 extracts the subscriber information from the details associated with the data message and generates a query to the subscriber database module 402 to access the subscriber's account information. The subscriber database module 402 replies with the information that is contained in its database; this includes the subscriber's class of service, the address of the subscriber's prepaid billing gateway module 406 and the address of the subscriber's internal data billing module 405. In Step 3 the rating module 403 combines the data message information with the subscriber information obtained from the subscriber database module 402 and submits the information to the most appropriate tariff plan as explained above to calculate the rate. The routing module 404 then determines what type of request was received from the messaging platform 20. If the request was simply an advice of charge request, the process moves to Step 20 and responds to the messaging platform 20 with the calculated tariff. Otherwise, if the request was a request to allow delivery of a message, the process moves to Step 4.

In Step 4 the calculated tariff is routed first to the subscriber's account within the internal data billing module If the subscriber has sufficient balance in his service or loyalty balances, the cost of the service may be covered. In this case an amount equivalent to the service or the cost of the service is deducted from the free or loyalty balance. The process then moves to Step 10, where a service grant is transmitted to the messaging platform 20.

In cases where the loyalty or service balances are not sufficient to pay for the transaction, the process moves to Step 5. Here it is determined which is the most appropriate billing system to route the tariff, either the internal data billing module 405 or the prepaid billing gateway module 406. This is typically determined by taking into account the tariff calculated in the rating module 403, and a combination of the values of the data message parameters received from the messaging platform 20 via the message interface module 401 and the information contained in the subscriber database module 402. These parameters may include for example the transaction service type, class of service and message trajectory (e.g. LA to MT etc.). If the routing module 404 determines that the most appropriate billing module is the prepaid billing gateway module 406, the process moves to Step 6. However if the routing module 404 determines that the most appropriate billing module is the internal data billing module 405, the process moves to Step 8.

In Step 6 the tariff is routed to the prepaid billing gateway module 406. Here the transaction is queued. When the transaction reaches the top of the queue, it is translated to a form supported by the external prepaid voice billing system 30 and transmitted to it.

In Step 7 the external prepaid voice billing system 30 replies with either a success or failure. If the reply is success, the loyalty balance within the internal data billing module 405 is updated to include loyalties received for using the service. The reply is translated to internal representation and forwarded to the routing module 404. The routing module 404 forwards the reply to the message interface module 401, who in turn sends it back to the messaging platform 20, either as a service grant or a service decline signal.

In Step 8 the tariff is routed to the internal data billing module 405, along with an indication of the preferred balances from which the cost is to be debited, and a set of alternative balances should there be insufficient capacity in the preferred one.

In Step 9 the internal data billing module 405 response with either a success or failure indication. If the reply is success, the loyalty balance within the internal data billing module 405 is updated to include loyalties received for using the service. The routing module 404 forwards the response to the message interface module 401, who in turn sends it back to the messaging platform 20, either as a service grant or a service decline signal.

Figure 16:
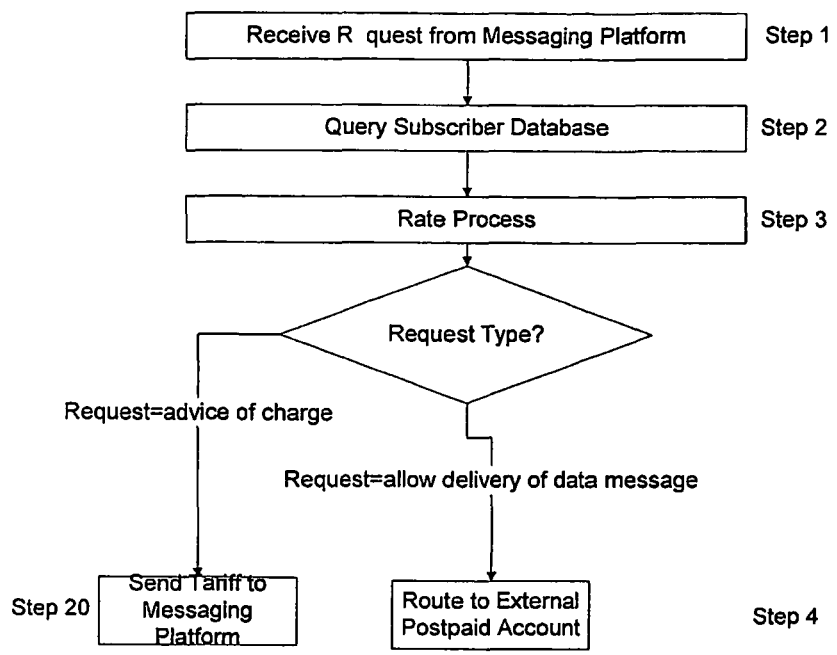
FIG. 16 is a process flowchart for an alternative embodiment, the provision of Post-paid direct charging mode.

FIG. 16 is a process flowchart for an alternative embodiment, the provision of a post-paid direct charging mode. In Step 1 the billing routing system 50 receives a request from the messaging platform 20 at its message interface module 401. Included in this request will be details associated with the data message corresponding to the request. For an SMS message type, these details may include time, PID, TON, NPI and originating MSC. A subscriber-unique indicia must also be sent with the request. Typically this is in the form of the subscriber IMSI, however the subscriber's MSISDN can be used if portability is not an issue. This information is then mapped from external to internal representation and the request is passed to the rating module 403.

In Step 2 the rating module 403 extracts the subscriber information from the details associated with the data message and generates a query to the subscriber database module 402 to access the subscriber's account information. The subscriber database module 402 replies with the information that is contained in its database; this includes the subscriber's class of service and the address of the subscriber's post-paid billing gateway module 407.

In Step 3 the rating module 403 combines the data message information with the subscriber information obtained from the subscriber database module 402 and submits the information to the most appropriate tariff plan as explained above to calculate the rate. The routing module 404 then determines what type of request was received from the messaging platform 20. If the request was simply an advice of charge request, the process moves to Step 20 and responds to the messaging platform 20 with the calculated tariff. Otherwise, if the request was a request to allow delivery of a message, the process moves to Step 4.

In Step 4 the calculated tariff is routed to the post-paid billing gateway module 407. Here depending on the configuration of the system, one of two possible scenarios will occur. If the system is configured to operate in batch mode, the tariff is logged to a post-paid account log and a service grant signal is returned to the messaging platform 20. This log account will later be batch processed by the external post-paid system 30 for charging to the post-paid subscriber's account at their next invoice. Alternatively, if the system is configured to operate in real time mode, the tariff is sent in real time to the external post-paid system 30 for logging to a transaction log account and a service grant signal is returned to the messaging platform 20. The transaction log account will later be used as the basis for charging the post-paid subscriber in their next invoice.

Figure 17:
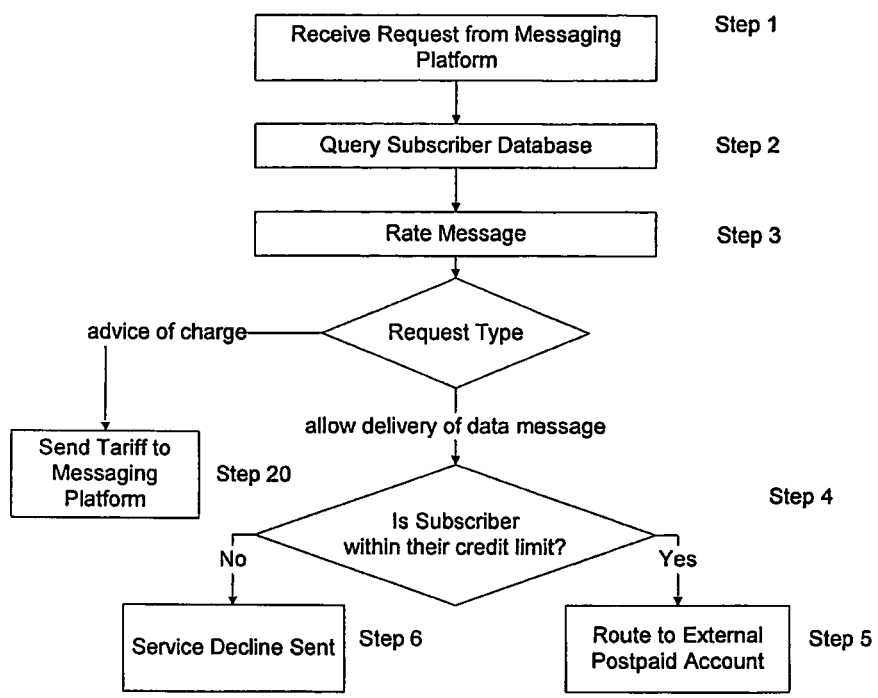
FIG. 17 is a process flowchart for an alternative embodiment, the provision of Post-paid direct charging mode with credit limit.

FIG. 17 is a process flowchart for an alternative embodiment, the provision of a post-paid direct charging mode with credit limit. In Step 1 the billing routing system 50 receives a request from the messaging platform 20 at its message interface module 401. Included in this request will be details associated with the data message corresponding to the request. For an SMS message type, these details may include the time, PID, TON, NPI and originating MSC. A subscriber-unique indicia must also be sent with the request. Typically this is in the form of the subscriber IMSI, however the subscriber's MSISDN can be used if portability is not an issue. This information is then mapped from external to internal representation and the request is passed to the rating module 403.

In Step 2 the rating module 403 extracts the subscriber information from the details associated with the data message and generates a query to the subscriber database module 402 to access the subscriber's account information. The subscriber database module 402 replies with the information that is contained in its database; this includes the subscriber's class of service and the address of the subscriber's post-paid billing gateway module 407 and the address of the subscriber's internal data billing module 405.

In Step 3 the rating module 403 combines the data message information with the subscriber information obtained from the subscriber database module 402 and submits the information to the most appropriate tariff plan as explained above to calculate the rate. The routing module 404 then determines what type of request was received from the messaging platform 20. If the request was simply an advice of charge request, the process moves to Step 20 and responds to the messaging platform 20 with the calculated tariff. Otherwise, if the request was a request to allow delivery of a message, the process moves to Step 4.

In Step 4 the system verifies if the post-paid subscriber is within their credit limit for data messages. If they have exceeded their credit limit, the process moves to Step 6 where a service decline is sent to the messaging platform 20. If they are within their credit limit however, the process moves to Step 5.

In Step 5 the calculated tariff is routed to the post-paid billing gateway module 407. Here depending on the configuration of the system, one of two possible scenarios will occur. If the system is configured to operate in batch mode, the tariff is logged to a post-paid account log and a service grant signal is returned to the messaging platform 20. This log account will later be batch processed by the external post-paid system 30 for charging to the post-paid subscriber's account at their next invoice. Alternatively, if the system is configured to operate in real time mode, the tariff is sent in real time to the external post-paid system 30 for logging to a transaction log account and a service grant signal is returned to the messaging platform 20. The transaction log account will later be used as the basis for charging the post-paid subscriber in their next invoice.

Figure 18:
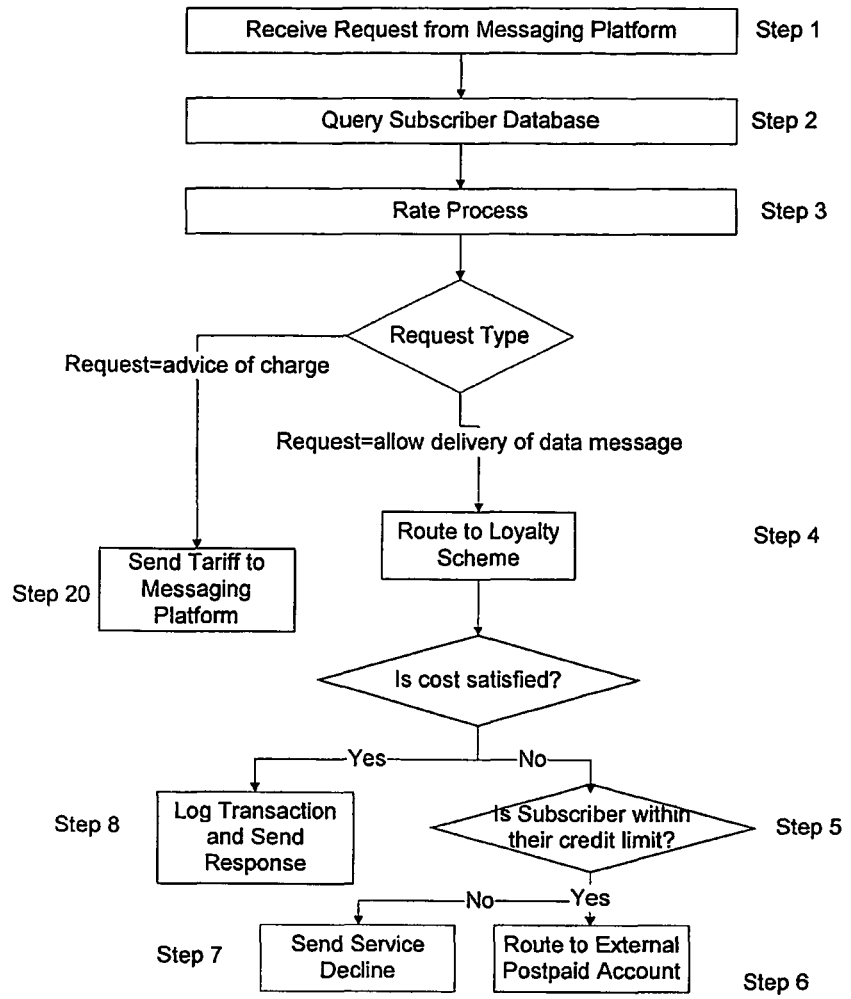
FIG. 18 is a process flowchart for an alternative embodiment, the provision of Post-paid direct charging mode with credit limit and loyalties.

FIG. 18 is a process flowchart for an alternative embodiment, the provision of a post-paid direct charging mode with credit limit and loyalties. In Step 1 the billing routing system 50 receives a request from the messaging platform 20 at its message interface module 401. Included in this request will be details associated with the data message corresponding to the request. For an SMS message type, these details may include the time, PID, TON, NPI and originating MSC. A subscriber-unique indicia must also be sent with the request. Typically this is in the form of the subscriber IMSI, however the subscriber's MSISDN can be used if portability is not an issue. This information is then mapped from external to internal representation and the request is passed to the rating module 403.

In Step 2 the rating module 403 extracts the subscriber information from the details associated with the data message and generates a query to the subscriber database module 402 to access the subscriber's account information. The subscriber database module 402 replies with the information that is contained in its database; this includes the subscriber's class of service, the address of the subscriber's post-paid billing gateway module 407 and the address of the subscriber's internal data billing module 405.

In Step 3 the rating module 403 combines the data message information with the subscriber information obtained from the subscriber database module 402 and submits the information to the most appropriate tariff plan as explained above to calculate the rate. The routing module 404 then determines what type of request was received from the messaging platform 20. If the request was simply an advice of charge request, the process moves to Step 20 and responds to the messaging platform 20 with the calculated tariff. Otherwise, if the request was a request to allow delivery of a message, the process moves to Step 4.

In Step 4 the calculated tariff is routed first to the subscriber's account within the internal data billing module 405. If the subscriber has sufficient balance in his service or loyalty balances, the cost of the service may be covered. In this case an amount equivalent to the service or the cost of the service is deducted from the free or loyalty balance. The process then moves to Step 8, where the already paid tariff is sent to the post-paid billing gateway module 407 for logging and a service grant is transmitted to the messaging platform 20. In cases where the loyalty or service balances are not sufficient to pay for the transaction, the process moves to Step 5.

In Step 5 the system verifies if the post-paid subscriber is within their credit limit for data messages. If they have exceeded their credit limit, the process moves to Step 7 where a service decline is sent to the messaging platform 20. If they are within their credit limit however, the loyalty balance within the internal data billing module 405 is updated to include loyalties received for using the service and the process moves to Step 6.

In Step 6 the calculated tariff is routed to the post-paid billing gateway module 407. Here depending on the configuration of the system, one of two possible scenarios will occur. If the system is configured to operate in batch mode, the tariff is logged to a post-paid account log and a service grant signal is returned to the messaging platform 20. This log account will later be batch processed by the external post-paid system 30 for charging to the post-paid subscriber's account at their next invoice. Alternatively, if the system is configured to operate in real time mode, the tariff is sent in real time to the external post-paid system 30 for logging to a transaction log account and a service grant signal is returned to the messaging platform 20. The transaction log account will later be used as the basis for charging the post-paid subscriber in their next invoice.

Figure 19:
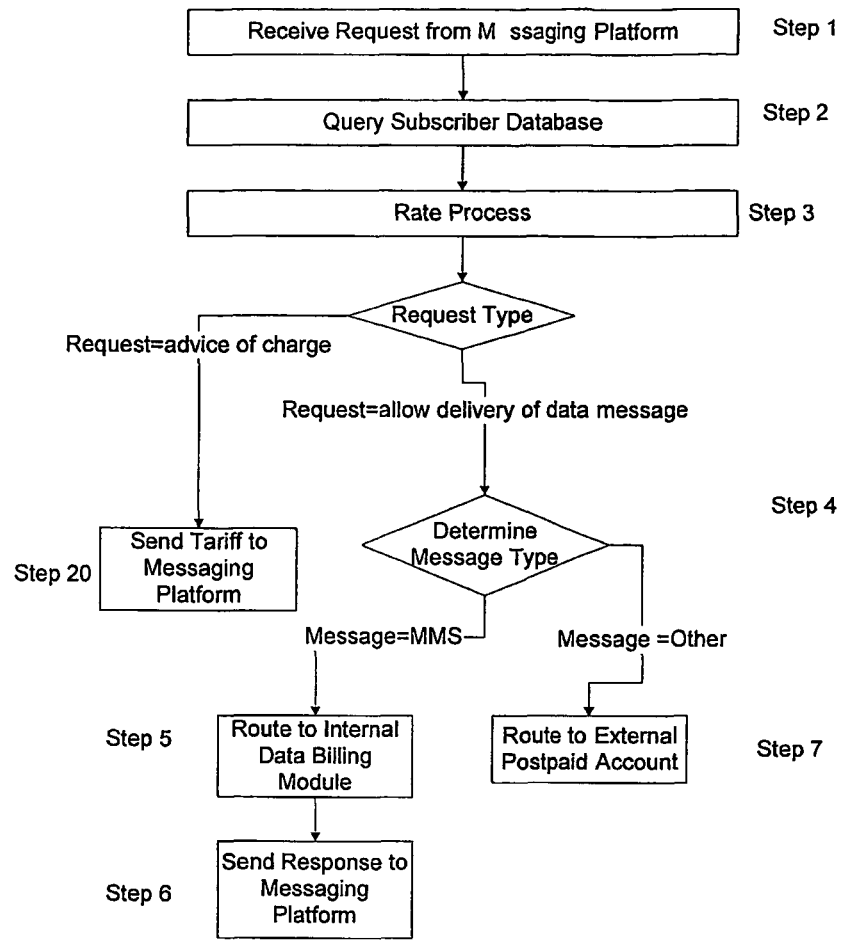
FIG. 19 is a process flowchart for an alternative embodiment, the provision of Post-paid with internal account for MMS message mode.

FIG. 19 is a process flowchart for an alternative embodiment, the provision of a post-paid with internal account for MMS message mode. However it will be appreciated that the same process flow would apply in a configuration where an internal account was to be used for another message type e.g. a SMS or WSB message.

In Step 1 the billing routing module receives a request to from the messaging platform 20 at its message interface module 401. Included in this request will be details associated with the data message corresponding to the request. For an SMS message details may include the time, PID, TON, NPI and originating MSC. For an MMS message these details may include content type, message class, message type and volume. A subscriber-unique indicia must also be sent with the request. Typically this is in the form of the subscriber IMSI, however the subscriber's MSISDN can be used if portability is not an issue. This information is then mapped from external to internal representation and the request is passed to the rating module 403.

In Step 2 the rating module 403 extracts the subscriber information from the details associated with the data message and generates a query to the subscriber database module 402 to access the subscriber's account information. The subscriber database module 402 replies with the information that is contained in its database; this includes the subscriber's class of service, the address of the subscriber's post-paid billing gateway module 407 and the address of the subscriber's internal data billing module 405.

In Step 3 the rating module combines the data message information with the subscriber information obtained from the subscriber database module 402 and submits the information to the most appropriate tariff plan as explained above to calculate the rate. The routing module 404 then determines what type of request was received from the messaging platform 20. If the request was simply an advice of charge request, the process moves to Step 20 and responds to the messaging platform 20 with the calculated tariff. Otherwise, if the request was a request to allow delivery of a message, the process moves to Step 4.

In Step 4 the system determines the message type. If the message is a MMS message, the process moves to Step 5. However if it is another message type, the process moves to Step 7.

In Step 5 the tariff is routed to the internal data billing module 405, along with an indication of the preferred balances from which the cost is to be debited, and a set of alternative balances should there be insufficient capacity in the preferred one.

In Step 6 the internal data billing module 405 responds with either a success or failure indication. The routing module 404 forwards the response to the message interface module 401, who in turn sends it back to the messaging platform 20, either as a service grant or a service decline signal.

In Step 7 the calculated tariff is routed to the post-paid billing gateway module 407. Here depending on the configuration of the system, one of two possible scenarios will occur. If the system is configured to operate in batch mode, the tariff is logged to a post-paid account log and a service grant signal is returned to the messaging platform 20. This log account will later be batch processed by the external post-paid system 30 for charging to the post-paid subscriber's account at their next invoice. Alternatively, if the system is configured to operate in real time mode, the tariff is sent in real time to the external post-paid system 30 for logging to a transaction log account and a service grant signal is returned to the messaging platform 20. The transaction log account will later be used as the basis for charging the post-paid subscriber in their next invoice.

However, as mentioned earlier, the most typical mode of operation would be a mode that combines one of the prepaid modes with one of the post-paid modes.

The billing system described above has several advantages over the prior art. It provides a real time rating of data messages for both pre and post paid subscribers where the calculation of the rate may be influenced by the values of several rating parameters. Thus the charging for data transactions may be finely tuned so that the charged tariff is highly dependent on the precise service provided by the network operator to a certain subscriber. It therefore maximises revenue potential.

The calculation of the rate is determined by a set of configurable rules. This provides network operators with the freedom to define the optimal method of tariff calculation for their requirements.

The billing routing system is also highly flexible. It provides the option of both static and dynamic routing configurations, where the billing destination is either predetermined by the configuration of the system, or determined based on the values of the data message parameters and the calculated rate.

The billing routing system also may maintain an internal account for billing prepaid data messages. This has the advantage of reducing the load on external subscriber accounts. However it has the option of updating the internal data account balance automatically from the subscriber's external prepaid voice account. Therefore it is only necessary for the subscriber to top-up one account i.e. their external voice account.

The system is also very flexible in that it provides the network operator with the option of billing subscribers locally at its internal data account, or externally at their prepaid or post-paid accounts.

The system also provides added options for subscribers that were not previously available, for example an option for a post-paid subscriber to maintain a credit limit on their data account. This prevents the possibility of receiving a large invoice at the end of a billing period.

As the system interfaces with the SMSC or other data switching centres, it can also provide for advanced prepaid services such as global roaming, as it is the SMSC that receives roaming SMS messages (rather than the MSC). It can also provide for subscriber refunds, as again as the system is interfacing with the SMSC—which is responsible for sending messages—the system can perform a refund if the message cannot be sent. This was not possible historically as the billing systems did not interface with the SMSC, but the MSC, which has no knowledge of whether or not the message was successfully delivered and it also does not receive roaming messages.

There has been hereinbefore described a method and system that is advantageous over the prior art. It will be appreciated that the invention has been described with reference to exemplary embodiments and it is only intended to limit the invention insofar as may be required in the light of the appended claims. It will also be appreciated that the words "comprises/comprising" and the words "having/including" when used herein with reference to the present invention are used to specify the presence of stated features, integers, Steps or components but does not preclude the presence or addition of one or more other features, integers, Steps, components or groups thereof.

The invention claimed is:

1. A method for routing a tariff associated with one or more data transactions in a mobile telecommunication network to an appropriate billing system, wherein the mobile telecommunication network incorporates a data switching centre, the data switching centre being adapted to receive data transactions transmitted by a subscriber to the telecommunication network and route them to an appropriate destination, the method comprising the steps of:
   a) receiving service detail records from the data switching centre associated with the mobile telecommunication network, the service detail records being associated with a specific data transaction having been previously transmitted by, or to, a subscriber within the telecommunication network, the service detail record containing a unique indicia associated with the subscriber;
   b) associating the retrieved unique indicia with one or more records previously stored in a subscriber database so as to establish a routing criteria for the specific subscriber,
   c) effecting the calculation of a tariff for the data transaction, and
   d) routing the tariff to one or more billing destinations, being selectable from a plurality of available billing destinations, in accordance with the routing criteria previously established, wherein if the tariff is routed to one or more billing destinations having a balance insufficient to pay for the transaction, at least part of the tariff is then routed to one or more further billing destinations.

2. The method as claimed in claim 1 wherein the routing criteria is determined based on the parameters uniquely associatable with the specific data transaction.

3. The method as claimed in claim 1 wherein the routing criteria is determined independently of parameters uniquely associatable with the specific data transaction.

4. The method as claimed in claim 1 wherein the one or more billing destinations are selected from the following:
   a) an account uniquely associatable with the subscriber, updatable by the subscriber, and referenceable by the subscriber database, and/or
   b) an account uniquely associatable with the subscriber, updatable by the subscriber, and interfaced with another component of the mobile network.

5. The method as claimed in claim 4 wherein the account is updatable upon the transmission of a data transaction by the subscriber within the telecommunication network.

6. The method as claimed in claim 1 wherein the routing of the tariff is effected in the same time frame as the transmission of the data transaction.

7. The method as claimed in claim 1 wherein the routing of the tariff is delayed for a predetermined time period so as to enable the grouping of multiple tariffs for subsequent routing to a billing destination.

8. The method as claimed in claim 1 wherein the one or more billing destinations are adapted to enable communication there between such that any one billing destination can be updated by another billing destination.

9. The method of claim 1, further wherein if the tariff is routed to one or more billing destinations having a balance insufficient to pay for the transaction, the whole tariff is then routed to one or more further billing destinations.

10. The method of claim 1, further wherein if the tariff is routed to one or more billing destinations having a balance insufficient to pay for the transaction, the overflow amount of the tariff is then routed to one or more further billing destinations.

11. A method of evaluating a data transaction so as to determine a correct transaction tariff value for the specific data transaction, the method comprising the steps of:
   a) receiving a message identifier from at least one messaging platform, the message identifier being associated with a specific data transaction from a data switching centre being routed through the messaging platform and having at least one unique identifier associated with a subscriber to the telecommunication network linkable thereto,
   b) comparing, by a billing routing system, the at least one identifier to a set of identifiers in a subscriber database previously defined so as to determine a correct transaction tariff value for the data transaction,
   c) routing the tariff value determined to one or more tariff destinations, the routing being determined based on the comparison of the at least one identifier with the set of identifiers previously defined and, wherein if the tariff is routed to one or more tariff destinations having a balance insufficient to pay for the transaction, at least part of the tariff is then routed to one or more further tariff destinations, and
   wherein the determination of the correct tariff value is effected in a multi-step process.

12. The method as claimed in claim 11, wherein the step of determining the correct tariff value for the transaction is effected by:
   a) applying a set of pre-configurable rules to rating parameters uniquely identifiable with the specific data transaction so as to determine a rating criteria for that data transaction, and
   b) comparing that rating criteria to a plurality of pricing criterion to evaluate the correct pricing criteria for that rating criteria, the correct pricing criteria providing the correct tariff value.

13. The method as claimed in claim 11 wherein the correct tariff value may be further modified by at least one price modifier, the at least one price modifier being definable by a set of rules uniquely associatable with the subscriber, and wherein the modified tariff value is the correct tariff value.

14. A billing and routing module for interfacing with a data switching centre, the module being adapted to evaluate specific data transactions and apply a suitable tariff to those transactions and also determine a suitable billing destination for those transactions, the module comprising:
- a) means for receiving at least one identifier uniquely associatable with a data transaction from the data switching centre,
- b) means for evaluating the data transaction so as to determine a correct tariff rate for that transaction,
- c) means for routing that tariff rate to a billing destination, and wherein the billing destination is selected from a plurality of configurable billing destinations, at least one of which is not co-resident with the module, and wherein if the tariff is routed to a billing destination having a balance insufficient to pay for the transaction, at least part of the tariff is then routed to one or more further billing destinations.

* * * * *